US012722307B2

(12) United States Patent
Baptist et al.

(10) Patent No.: US 12,722,307 B2
(45) Date of Patent: Sep. 1, 2026

(54) ROBOT SKIN APPARATUS, METHOD OF FABRICATING A ROBOT SKIN APPARATUS, AND A SYSTEM INCLUDING A ROBOT SKIN APPARATUS

(71) Applicant: University of Louisville Research Foundation, Inc., Louisville, KY (US)

(72) Inventors: Joshua R. Baptist, Louisville, KY (US); Mohammad Nasser Saadatzi, Louisville, KY (US); Zhong Yang, Louisville, KY (US); Ruoshi Zhang, Louisville, KY (US); Dan O. Popa, Louisville, KY (US)

(73) Assignee: University of Louisville Research Foundation, Inc., Louisville, KY (US)

( * ) Notice: Subject to any disclaimer, the term of this patent is extended or adjusted under 35 U.S.C. 154(b) by 631 days.

(21) Appl. No.: 18/086,877

(22) Filed: Dec. 22, 2022

(65) Prior Publication Data

US 2023/0130680 A1 Apr. 27, 2023

Related U.S. Application Data

(62) Division of application No. 16/500,295, filed as application No. PCT/US2018/026478 on Apr. 6, 2018, now Pat. No. 11,541,550.

(Continued)

(51) Int. Cl.
*B25J 13/08* (2006.01)
*B25J 15/02* (2006.01)

(52) U.S. Cl.
CPC .......... *B25J 13/084* (2013.01); *B25J 15/024* (2013.01)

(58) Field of Classification Search
CPC ...... B25J 13/084; B25J 15/024; B25J 19/066; B25J 13/082
See application file for complete search history.

(56) References Cited

U.S. PATENT DOCUMENTS 11,541,550 B2 1/2023 Baptist et al.
2006/0071286 A1 4/2006 Axelrod et al.

(Continued)

FOREIGN PATENT DOCUMENTS

WO WO 2016/086306 A1 6/2016
WO WO 2018/187704 A1 10/2018

OTHER PUBLICATIONS

International Search Report and Written Opinion corresponding to International Patent Application No. PCT/US2018/026478 dated Aug. 1, 2018.

(Continued)

*Primary Examiner* — Basil T. Jos
(74) *Attorney, Agent, or Firm* — Hamilton, Brook, Smith & Reynolds, P.C.

(57) ABSTRACT

A robot skin apparatus includes polymer membranes encapsulating a pressure sensor. The sensor includes piezo-sensitive material in contact with a pair of electrodes in spaced relationship to form a circuit. The apparatus may include a flexible substrate, with the electrodes thereon. The piezo-sensitive material may be piezoresistive film. The electrodes may be symmetrically patterned on the substrate to form a substantially circular peripheral boundary. The apparatus may include pressure sensors on opposite sides of a plane for temperature compensation, a plurality of pressure sensors arrayed on the substrate, and a data acquisition system. A method of fabricating the apparatus includes a wet lithography process for patterning the piezoresistive film. A system includes a pair of gripper fingers, an actuator connected to the fingers, a robot skin apparatus positioned on one of the (Continued)

fingers, and an electronic unit for receiving data from the robot skin and controlling the fingers.

5 Claims, 25 Drawing Sheets

Related U.S. Application Data

(60) Provisional application No. 62/483,116, filed on Apr. 7, 2017.

(56) References Cited

U.S. PATENT DOCUMENTS

| | | | | |
|---|---|---|---|---|
| 2008/0123078 | A1* | 5/2008 | Saraf | B25J 13/084 977/956 |
| 2009/0031825 | A1 | 2/2009 | Kishida et al. | |
| 2009/0158864 | A1 | 6/2009 | Hayakawa et al. | |
| 2010/0181871 | A1 | 7/2010 | Daniel et al. | |
| 2011/0193363 | A1 | 8/2011 | Nishiwaki | |
| 2011/0226069 | A1 | 9/2011 | Kim et al. | |
| 2014/0214206 | A1* | 7/2014 | Steinberg | B25J 13/025 700/258 |
| 2015/0248159 | A1 | 9/2015 | Luo et al. | |
| 2016/0147352 | A1 | 5/2016 | Filiz et al. | |
| 2017/0239821 | A1* | 8/2017 | Lessing | B25J 15/12 |
| 2020/0070356 | A1 | 3/2020 | Baptist et al. | |

OTHER PUBLICATIONS

International Preliminary Report on Patentability (Chapter I of the Patent Cooperation Treaty) corresponding to International Patent Application No. PCT/US2018/026478 dated Oct. 17, 2019.

Ayres et al. (1981) "The impacts of industrial robots" [ebook] Pittsburgh: Carnegie-Mellon University. Available at: http://repository.cmu.edu/cgi/viewcontent.cgi?article=1484&context=robotics [Accessed Nov. 2017].

Bostelman et al. (2012). "Survey of Industrial Manipulation Technologies for Autonomous Assembly Applications" [ebook] Gaithersburg: NIST, pp. 1-63 (Eg: 3 & 40). Available at: http://ws680.nist.gov/publication/get_pdf.cfm?pub_id=908608 [Accessed Nov. 2017].

Castellanos-Ramos (2010) "Tactile Sensors Based on Conductive Polymers," Microsystem Technologies, vol. 16, pp. 765-776.

"Cobots and Industrial Robots: Choose the Right Robot for the Job" (2017). [ebook] TM Robotics. Available at: http://www.tmrobotics.co.uk/wp-content/uploads/2017/04/Collaborative-vs.-Industrial-robot-wp_FINAL_3-16-17.pdf [Accessed Nov. 2017].

IBA Global Employment Institute (2017) Artificial Intelligence and Robotics and Their Impact on the Workplace. [ebook]. Available at: https://www.ibanet.org/Document/Default.aspx?DocumentUid=c06aa1a3-d355-4866-beda-9a3a8779ba6e [Accessed Nov. 2017].

IFR.org. (2017). How robots conquer industry worldwide. [online] Available at: https://ifr.org/downloads/press/Presentation_PC_27_Sept_2017.pdf [Accessed Nov. 2017].

Industrial Safety Requirements for Collaborative Robots and Applications. (2014). [ebook] ABB. Available at: https://www.roboticsbusinessreview.com/wp-content/uploads/2016/05/Industrial_HRC_ERF2014_.pdf [Accessed Nov. 2017].

Lewis (2017) "The facts about Co-Bot Robot sales" [online] RobotEnomics. Available at: https://robotenomics.com/2016/01/11/the-facts-about-co-bot-robot-sales/?iframe=true [Accessed Nov. 2017].

Miller (1984) Impacts of robotic and flexible manufacturing technologies on manufacturing costs and employment. Ph.D. Carnegie-Mellon University.

Moniz et al. (2016) "Robots Working with Humans or Humans Working with Robots? Searching for Social Dimensions in New Human-Robot Interaction in Industry," Societies, vol. 6, pp. 1-21.

T97—New ANSI RIA R15.06: Robot and Robot System Safety. (2014). [ebook] Rockwell Automation. Available at: https://www.rockwellautomation.com/resources/downloads/rockwellautomation/pdf/events/raotm/sessions/tech/T97NewANSIRIAR1506RobotandRobotSystemSafety.pdf [Accessed Nov. 2017].

Tai et al. (2016). State of the Art Robotic Grippers and Applications. Robotics, vol. 5, pp. 1-20.

Office Action (Restriction Requirement) corresponding to U.S. Appl. No. 16/500,295 dated Dec. 16, 2021.

Notice of Allowance and Interview Summary corresponding to U.S. Appl. No. 16/500,295 dated Aug. 10, 2022.

* cited by examiner 300
302

302
314
312
310
306
308
316
Silicone
Kapton Layer
PEDOT Layer
Gold Layer
Gold Layer
Kapton Layer
Silicone
304
300

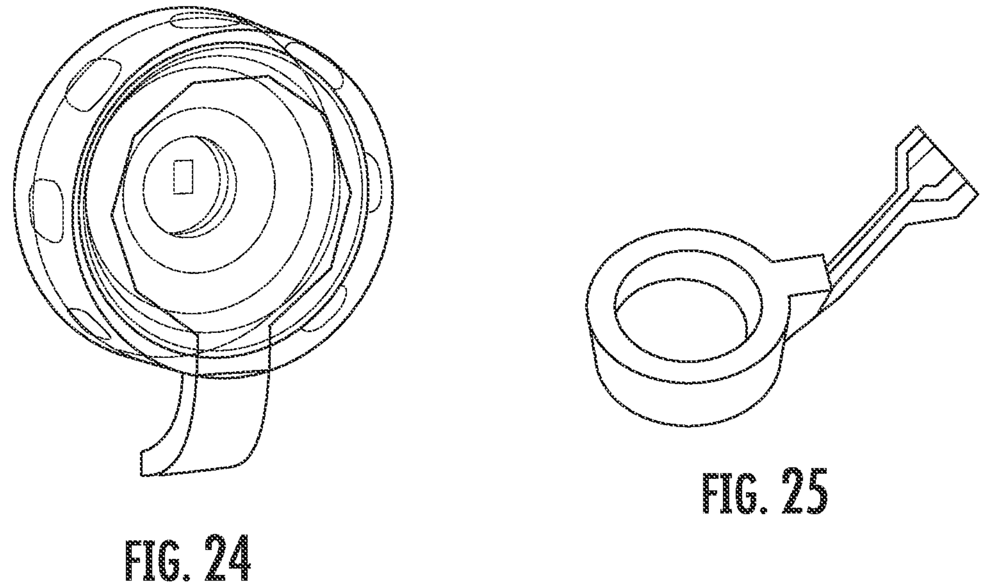
FIG. 24
FIG. 25
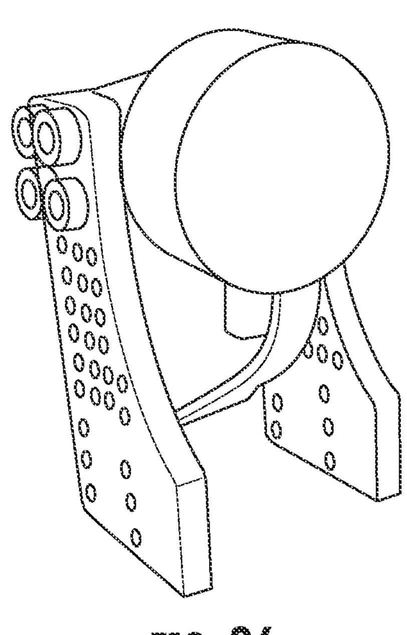
FIG. 26

LOAD CELL'S OUTPUT (N)

TIME (SEC)

ROBOT SKIN APPARATUS, METHOD OF FABRICATING A ROBOT SKIN APPARATUS, AND A SYSTEM INCLUDING A ROBOT SKIN APPARATUS

RELATED APPLICATIONS

This application claims priority to U.S. Provisional Patent Application No. 62/483,116, filed Apr. 7, 2017, the entire disclosure of which is incorporated herein by reference.

STATEMENT REGARDING FEDERALLY SPONSORED RESEARCH OR DEVELOPMENT

The presently disclosed subject matter was made with support from the U.S. Government under Grant #IIS 1208623—"NRI-Small: Multi-modal sensor skin and garments for healthcare and home robots," Project #IIP 1643989—"PFI:BIC—Adaptive Robotic Nursing Assistants for Physical Tasks in Hospital Environments," and Project IIP #1713741—"I-Corps: Multi-modal Robot Skins for Adaptive Human-Machine Interfaces" awarded by the National Science Foundation. Thus, the U.S. Government has certain rights in the presently disclosed subject matter.

BACKGROUND OF THE INVENTION

1. Field of the Invention

The presently-disclosed subject matter relates to force sensitive robot skin for adaptive machine interfaces.

2. Description of Related Art

Over the last half century, the Robotics and Automation (RA) industry has established a technology base that is routinely employed in manufacturing applications for both medium and high volume production [1-3]. Specifically, modern manufacturing paradigms uses fixtures (also referred to as "clamps") and robots equipped with end-effectors (grippers) as standard components in flexible automation lines. The economic driver for employing this technology over manual labor increases production throughput (lowering manufacturing costs) and in quality (lowering maintenance costs) [4].

During the last decade, the concept of "collaborative robot or co-robot", e.g. a robot that can work side by side with humans is making its gradual introduction in some production lines around the globe [5]. One of the advantages of a co-robot is that it is "taught by demonstration" by humans through intuitive physical interaction. Operators simply "show" the robot how to grasp and manipulate components by direct touch. There is an emerging consensus, yet to be fully proven, that if deployed effectively, co-Robots have the ability to reduce both installation and operating costs of future RA production lines by relying on intuitive human guidance. Because of human safety requirements, however, co-Robots must adhere to new standards, such as ANSI/RIA R15.06-2012 or ISO 10218-1 & 2 [6-8], which provide guidelines for robot manufacturers and system integrators. These standards, mandate that co-Robots be lightweight, move relatively slowly, and be able to detect physical contact or proximity with humans through active sensors [9]. As a result, today's co-Robots are more expensive (up to 50% of the cost of traditional industrial robot), while at the same time they operate at lower speeds (perhaps 5-10×) than conventional robots [10]. Therefore, it is not surprising that despite the buzz they have generated, the market penetration of co-Robots today is less than 5% of the total installed robot base, e.g. most of the deployed robots in production today are non-collaborative [11]. Furthermore, nearly all of the pneumatic industrial grippers and clamps used in conjunction with robots are simply on-off graspers without active force feedback [12,13], requiring repeated calibration to achieve stable and non-damaging grasps.

BRIEF SUMMARY OF THE INVENTION

The applications of the present invention consist of robot and gripper equipment, and automation systems for ultimate users consisting of medium or large volume manufacturers. The present invention allows the conversion of non-collaborative industrial robot systems to units with force sensitive skin deployed on their end-effectors and body that enable teaching by demonstration, increase manipulation capabilities through force sensing, reduce qualifications of operating personnel, downtime and idle time of robots in production facilities.

As a result of this conversion, conventional industrial robots will retain their inherent economic advantage provided by high cycle speeds, while being also able to provide controlled forces during physical interaction with people and the environment, and the ability to be intuitively programmed through "teach by demonstration".

According to one aspect of the invention, a robot skin apparatus includes: a first pressure sensor; and polymer membranes encapsulating the first pressure sensor. Advantageously, the polymer membranes acting as applied force diffusion layers.

In one implementation, the polymer membranes comprise polymerized siloxane.

In another implementation, the first pressure sensor includes a first electrode and a second electrode in spaced relationship, and a piezo-sensitive material in contact with the first electrode and the second electrode to form a circuit therewith.

In an important embodiment, the robot skin apparatus further includes a first flexible substrate, and the first electrode and the second electrode are positioned on the first flexible substrate. The piezo-sensitive material is a flexible piezoresistive film covering the first electrode, the second electrode, and the space therebetween to form the circuit therewith, the circuit having a resistance varying with a strain on the first flexible substrate and the flexible piezoresistive film. The first flexible substrate may be a polyimide film. The flexible piezoresistive film may include Poly(3,4-ethylenedioxythiophene)-poly(styrenesulfonate) (PEDOT:PSS) mixed with a solvent.

In another important embodiment, the first electrode and the second electrode are symmetrically patterned on the first flexible substrate to form a substantially circular peripheral boundary. In some embodiments, the first electrode and the second electrode are symmetrically patterned on the first flexible substrate in a star-shaped structure. In some embodiments, the first electrode and the second electrode are symmetrically patterned on the first flexible substrate in a circular tree-shaped structure.

In accordance with another implementation, the robot skin apparatus further includes a second flexible substrate and a second pressure sensor. The second pressure sensor respectively includes: a pair of electrodes in spaced relationship on the flexible substrate; and a flexible piezoresistive film covering the pair of electrodes and the space therebetween to form a circuit therewith. The second flexible substrate is positioned back-to-back with the first flexible substrate such that the second pressure sensor is in an opposing relationship with the first pressure sensor. The polymer membranes also encapsulate the second pressure sensor.

In accordance with yet another implementation, the robot skin apparatus further includes a plurality of other pressure sensors. Each of the plurality of other pressure sensors respectively includes a pair of electrodes in spaced relationship on the flexible substrate and a flexible piezoresistive film covering the pair of electrodes and the space therebetween to form a circuit therewith. The first pressure sensor and the plurality of other pressure sensors are arrayed on the first flexible substrate and are encapsulated by the polymer membranes to form a sensor array.

In another embodiment, robot skin apparatus further includes: a multiplexer, a measurement circuit, a microcontroller, and a digital-to-analog converter (DAC). The multiplexer includes inputs in communication with each of the first pressure sensor and the plurality of other pressure sensors of the sensor array, an output, and an input select line. The multiplexer uses the input select line to select which input to send to the output. The measurement circuit has a measurement input, an adjustment input, and an output. The measurement input is in communication with the output of the multiplexer. The output of the measurement circuit is a voltage signal representing the respective electrical resistance of each of the multiple strain sensors as the multiplexer sequentially switches between the multiple strain sensors. The adjustment input is for balancing out the bridge for differing baseline resistances of each of the multiple strain sensors. The microcontroller includes a first output, a second output, and an analog-to-digital converter (ADC) input in electrical communication with the output of the Wheatstone bridge circuit. The digital-to-analog converter (DAC) has an input in electrical communication with the first output of the microcontroller, and an output in electrical communication with the adjustment input of the measurement circuit. The microcontroller executes instructions stored on a non-transitory medium for: determining a baseline reading of each sensor when no force is applied to the sensor array; and determining a pressure reading of each sensor when a force is applied to the sensor array. Determining a baseline reading of each sensor when no force is applied to the sensor array may include: causing the multiplexer to open a channel and apply power to a corresponding pressure sensor; then reading the voltage signal at the output of the measurement circuit and driving the DAC to output a matching voltage to balance the measurement circuit; and then recording the matching voltage as the baseline reading of the corresponding pressure sensor. Determining a pressure reading of each sensor when a force is applied to the sensor array may include: causing the multiplexer to open a channel and apply power to a corresponding pressure sensor; loading the baseline reading of the corresponding pressure sensor to the DAC and then reading the voltage signal at the output of the measurement circuit; and calculating the pressure reading of the corresponding sensor based on the voltage signal, which indicates the change in the electrical resistance of the corresponding sensor and the force applied thereto.

In yet another embodiment, the first pressure sensor and the plurality of other pressure sensors are arrayed in pairs in a Wheatstone half-bridge configuration, each pair positioned back-to-back for temperature compensation. The robot skin apparatus then further includes: measurement circuitry for measuring an output voltage of each of the pressure sensors arrayed in pairs in the Wheatstone half-bridge configuration and converting the output voltage to a digital signal; and a microcontroller for receiving the digital signal from the measurement circuitry and calculating the pressure reading of each of the pressure sensors based on the digital signal, which indicates the change in the electrical resistance of each of the pressure sensors and a corresponding force applied thereto.

According to another aspect of the invention, a method of fabricating a robot skin apparatus includes: coating a first carrier wafer with a photoresist material; laminating a Kapton sheet onto the silicon carrier wafer; spinning photoresist material onto the Kapton sheet; exposing the photoresist material through a mask to create interdigitated electrode patterns on the photoresist material; developing and etching the exposed photoresist material to create the interdigitated electrode patterns in the photoresist and on the Kapton sheet; depositing a conductive material onto the Kapton sheet in the interdigitated electrode pattern; removing the remaining photoresist material to leave the conductive material in the interdigitated electrode pattern on the Kapton sheet; placing the first carrier wafer and the Kapton sheet in a solvent lift-off bath in order to separate the Kapton sheet from the silicon carrier wafer; adhering the Kapton sheet to a second carrier wafer with a photoresist material; spinning a single layer of photoresist material onto the Kapton sheet with the conductive material in the interdigitated electrode pattern; exposing, developing, and etching the single layer of photoresist material to expose the conductive material in the interdigitated electrode pattern; spinning a solution of Poly (3,4-ethylenedioxythiophene)-poly(styrenesulfonate) (PEDOT:PSS) mixed with a solvent onto the remaining photoresist material and the conductive material; drying the PEDOT:PSS solution to leave PEDOT:PSS on the remaining photoresist material and the conductive material; and transferring the second carrier wafer and the Kapton sheet to another solvent lift-off bath to dissolve the photoresist material, leaving the Kapton sheet with PEDOT:PSS patterned over the conductive material in the interdigitated electrode pattern.

According to yet another aspect of the invention, a system includes: a pair of gripper fingers defining a space for receiving a workpiece; a pneumatic actuator connected to the gripper fingers; a pressure regulator; a robot skin apparatus positioned on one of the gripper fingers; and a main electronic unit. The pneumatic actuator is for causing the gripper fingers to open or close. The pneumatic actuator has an input for receiving a pressurized fluid. The pressure regulator has a fluid input in fluid communication with a pressurized fluid source, an output in fluid communication with the pneumatic actuator, and a control signal input for controlling the connection of the pressurized fluid source to the output. The robot skin apparatus is positioned on one of the gripper fingers facing the other of the gripper fingers and the space for receiving the workpiece. The robot skin apparatus includes a first pressure sensor and polymer membranes encapsulating the first pressure sensor. The polymer membranes act as applied force diffusion layers. The main electronic unit includes: a microcontroller; an analog-to-digital converter (ADC), and an output device. The ADC has an input in communication with the pressure sensor and an output in communication with the microcontroller. The output device is in communication with the microcontroller and the control signal input of the pressure regulator. The microcontroller is for processing data received from the robot skin apparatus via the ADC and determining control effort for controlling the pressure regulator via the output device.

In one implementation, the pressure sensor includes a first electrode and a second electrode in spaced relationship, and a piezo-sensitive material in contact with the first electrode and the second electrode to form a circuit therewith. The system may further include a first flexible substrate, with the first electrode and the second electrode positioned on the first flexible substrate. The piezo-sensitive material may then be a flexible piezoresistive film covering the first electrode, the second electrode, and the space therebetween to form the circuit therewith, such that the circuit has a resistance varying with a strain on the first flexible substrate and the flexible piezoresistive film. The first electrode and the second electrode may be symmetrically patterned on the first flexible substrate to form a substantially circular peripheral boundary.

BRIEF DESCRIPTION OF THE DRAWINGS

FIG. 21, which includes

FIG. 24 through FIG. 26 are schematic diagrams of a trampoline-like sleeve for integrating a robot skin apparatus with a pneumatic gripper, according to the invention.

DETAIL DESCRIPTION OF EXEMPLARY EMBODIMENTS

Figure 1:
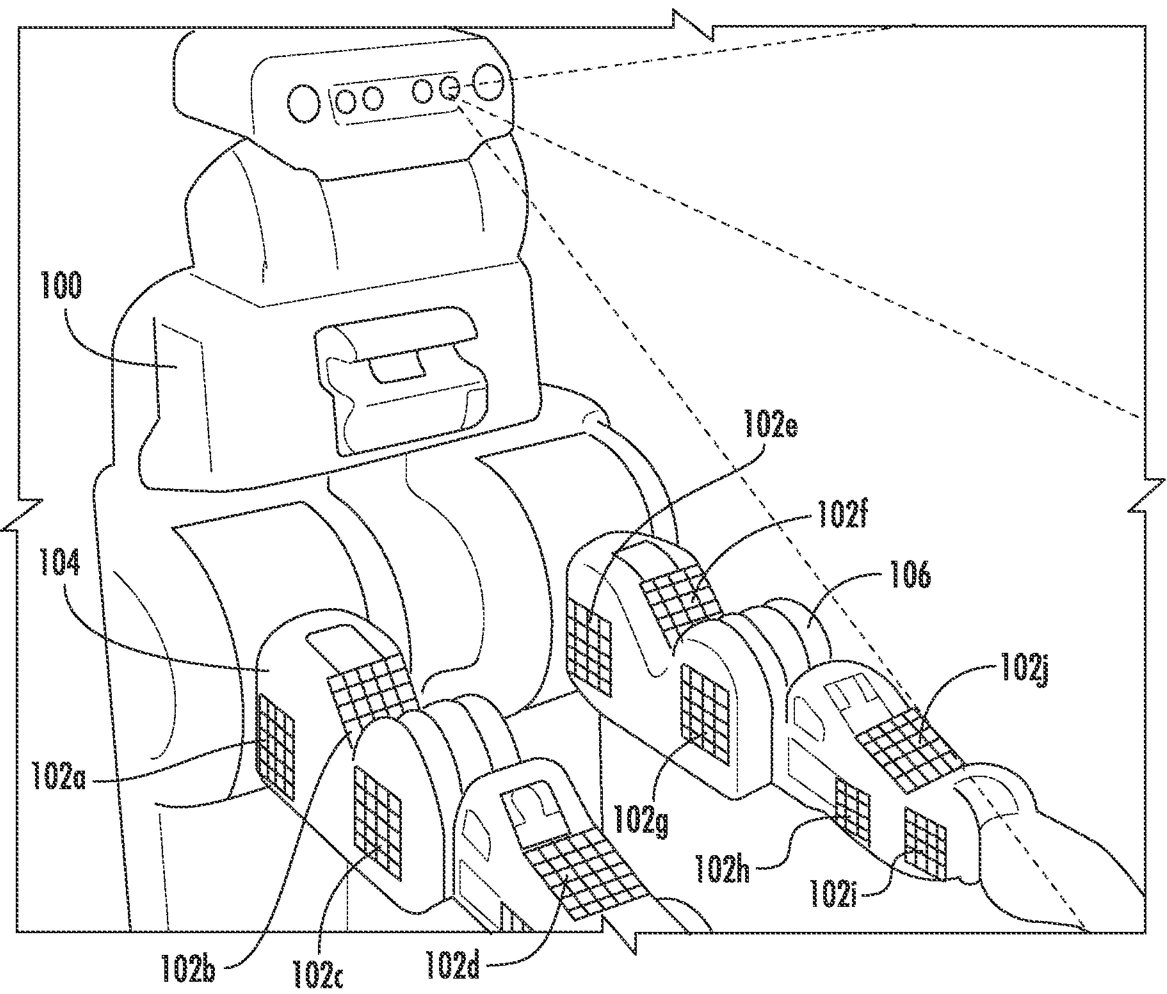
FIG. 1 is a schematic diagram of an exemplary robot including robot skin apparatus patches, according to the invention.

The details of one or more embodiments of the presently-disclosed invention are set forth in the attachments to this document. Modifications to embodiments described in these attachments, and other embodiments, will be evident to those of ordinary skill in the art after a study of the information provided in these attachments. The information provided in these attachments, and particularly the specific details of the described exemplary embodiments, is provided primarily for clearness of understanding and no unnecessary limitations are to be understood therefrom. In case of conflict, the specification of this document, including definitions, will control.

While the terms used herein are believed to be well understood by one of ordinary skill in the art, definitions are set forth herein to facilitate explanation of the presently-disclosed subject matter.

Unless defined otherwise, all technical and scientific terms used herein have the same meaning as commonly understood by one of ordinary skill in the art to which the presently-disclosed subject matter belongs. Although any methods, devices, and materials similar or equivalent to those described herein can be used in the practice or testing of the presently-disclosed subject matter, representative methods, devices, and materials are now described.

Following long-standing patent law convention, the terms "a", "an", and "the" refer to "one or more" when used in this application, including the claims.

Unless otherwise indicated, all numbers expressing quantities of ingredients, properties such as reaction conditions, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the term "piezo-sensitive" is intended to refer to either a piezoelectric characteristic or a piezoresistive characteristic.

1. Exemplary Applications

Figure 2:
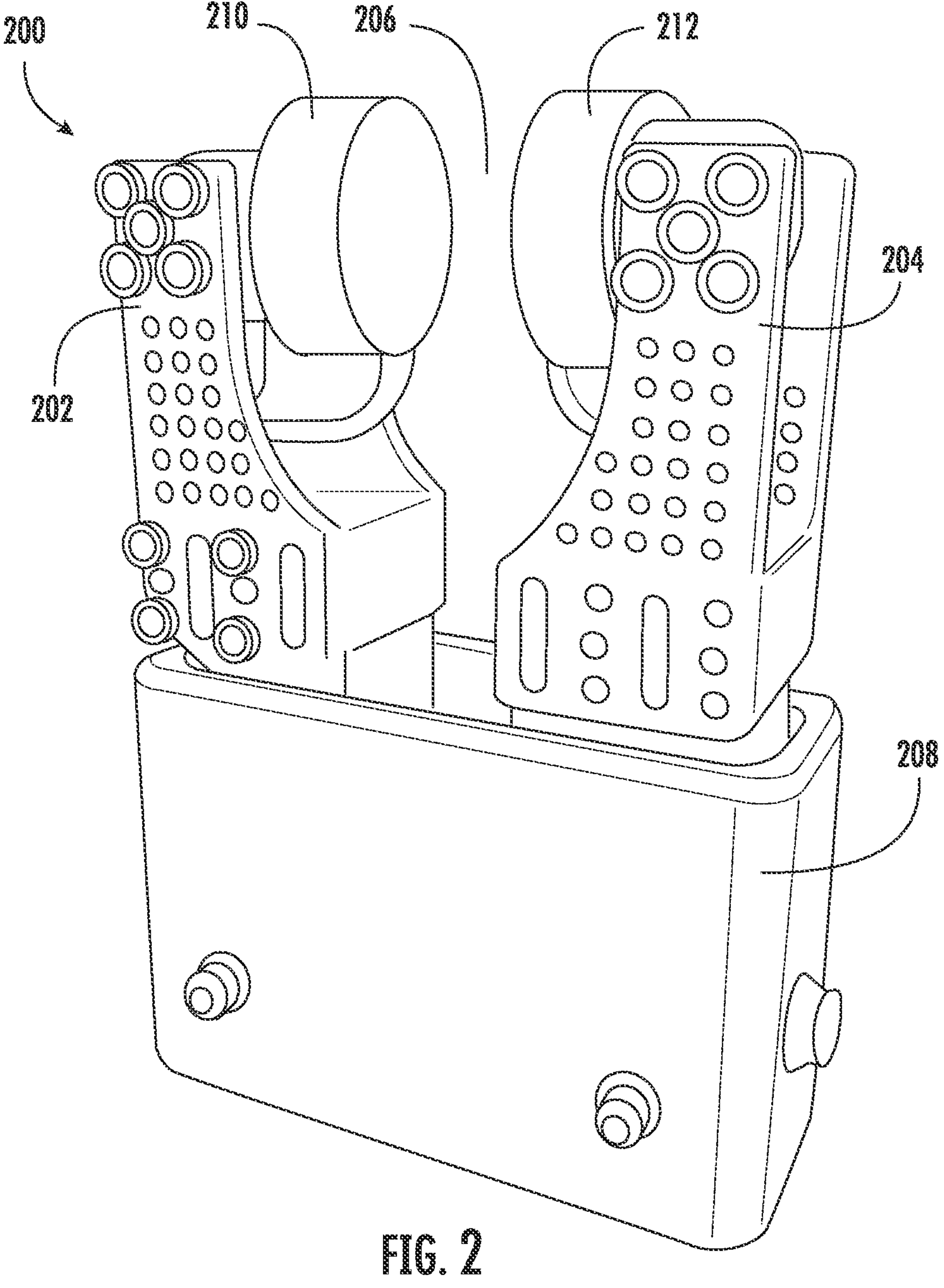
FIG. 2 is a schematic diagram of an exemplary pneumatic gripper including robot skin apparatuses positioned on gripper fingers, according to the invention.

FIG. 1 shows an exemplary robot 100 including robot skin apparatus patches 102*a*-102*j* positioned on movable arms 104, 106 of the robot for providing tactile feedback for control of the movable arms 104, 106. FIG. 2 shows an exemplary pneumatic gripper 200 including a pair of gripper fingers 202, 204 defining a space 206 for receiving a workpiece (not shown). A pneumatic actuator 208 is connected to the gripper fingers 202, 204 for causing the gripper fingers 202, 204 to open or close. Robot skin apparatuses 210, 212 are positioned on the gripper fingers 202, 204 facing each other and the space 206/workpiece (not shown), again for providing tactile feedback for control of the gripper fingers 202, 204.

In the broader realization of applications that could benefit from advanced tactile sensors, the invention has applications in products beyond robots and pneumatic grippers, ranging from toys, gaming controllers, mobile devices, to fabrics and furniture. In the age of "big data", the industry seeks to find applications and methods to extract valuable information from seemingly miniscule actions. As such, force data can and will play a critical role in allowing mankind to interface with technology- and technology to interact with mankind via tactile sensations.

The exemplary embodiments disclosed herein include pressure sensors that can detect forces applied normally on the robot skin apparatus using a piezoresistive polymeric strain gauge (i.e., a force sensor). The advantage of these gauges is the ease of fabrication on flexible substrates and integration into the robot. Such sensors can be modified for additional 3D force measurement to include shear (lateral) forces in addition to normal forces. However, one of skill in the art will recognize that certain aspects of the disclosed invention apply equally to other types of force sensors, including capacitive sensors, electromagnetic sensors, piezoelectric sensors, optical sensors, and potentiometric sensors. No unnecessary limitations from the exemplary embodiments are to be read into the claims that follows.

The exemplary pressure sensitive material for the sensors, as discussed in more detail below, is a variant formulation of an organic semiconductor material Poly(3,4-ethylenedioxythiophene)-poly(styrenesulfonate) or PEDOT:PSS which a flexible piezoresistive polymer. PEDOT:PSS is of higher gauge factor (17.8±4) compared to the off-the-shelf metal-based strain gauges, and it is relatively easy to deposit or pattern on sensor locations on the substrate. The material composition of this original ink was modified to allow it to be deposited and patterned using cleanroom lithographical fabrication methods.

2. Robot Skin Apparatus

Figures 3, 4:
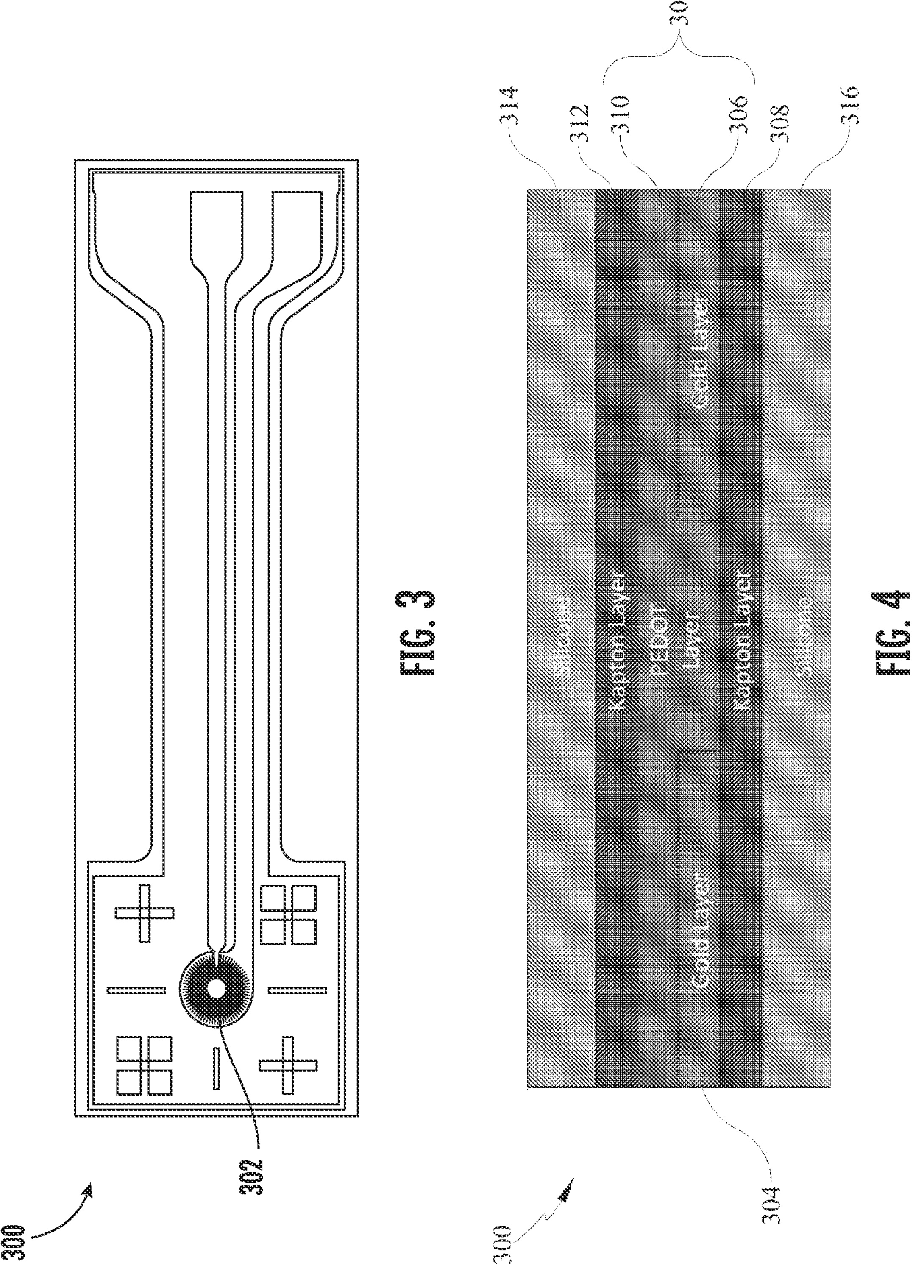
FIG. 3 is a top schematic view of an exemplary robot skin apparatus according to the invention.
FIG. 4 is a side sectional schematic of an exemplary robot skin apparatus according to the invention.

FIG. 3 is a top schematic view and FIG. 4 is a side sectional schematic of an exemplary robot skin apparatus 300 according to the invention. The exemplary robot skin apparatus 300 includes a first pressure sensor 302 including: a first electrode (Gold Layer) 304 and a second electrode (Gold Layer) 306 in spaced relationship; and a flexible piezoresistive film (PEDOT Layer) 310 covering the first electrode 304, the second electrode 306, and the space therebetween. The flexible piezoresistive film 310 forms a circuit with the first electrode 304 and the second electrode 306, the circuit having a resistance varying with a strain on the flexible piezoresistive film 310. As such, the exemplary apparatus 300 is a strain-gauge-type sensor. However, one of skill in the art will recognize that aspects of the disclosed invention apply equally to other sensors utilizing piezoresistive material, such as force-sensitive-resistor (FSR) type sensors. No unnecessary limitations from the exemplary embodiments are to be read into the claims that follows.

In the exemplary apparatus 300, the first electrode 304 and the second electrode 306 are, preferably, symmetrically patterned on a first flexible substrate (Kapton Layer) 308 to form a substantially circular peripheral boundary (discussed below). A first flexible covering layer (Kapton Layer) 312 covers the first flexible substrate 308 and the first pressure sensor 302. Polymer membranes (Silicone) 314, 316 encapsulate the first flexible substrate 308, the first pressure sensor 302, and the first flexible covering layer 312. Depending on the process to deposit the piezoresistive film (PEDOT layer) 310, the resting resistance (the resistance measured when no force is applied onto the first pressure sensor 302) may vary from tens of ohms to even kilo ohms.

As noted, the first flexible substrate is preferably a polyimide film, such as Kapton®, the electrodes are micro-patterned gold, and the flexible piezoresistive film is a variant formulation of PEDOT:PSS. Advantageously, this choice of materials results in ease of manufacturing and superior gauge factor ensuring adequate sensitivity. An exemplary fabrication process is discussed below.

3. Symmetrically Patterned Electrodes

FIG. 5 through FIG. 7, and FIG. 31 through FIG. 35 are schematic diagrams of exemplary symmetrically patterned electrode structures forming substantially circular peripheral boundaries. These exemplary symmetrically patterned electrode structures detect forces applied normally to the electrode pattern, and exhibit a symmetric omni-axial response thanks to their geometry (i.e., symmetry and circular peripheral boundary). The symmetric electrode patterns ensure that the gauge response depends only on the distance between the center of the gauge and the point application of the force. This allows for easy calculation of the resultant force on a skin patch as a sum of Gaussian pressure profiles (discussed below). The resultant force can then be used as a control signal to drive a robot, prosthetic, gripper, etc. Sensors having circular symmetry also provide a response to pressure that is spatially circularly symmetric. Longer electrode lengths and smaller electrode separations provide higher sensitivities.

Figure 5:
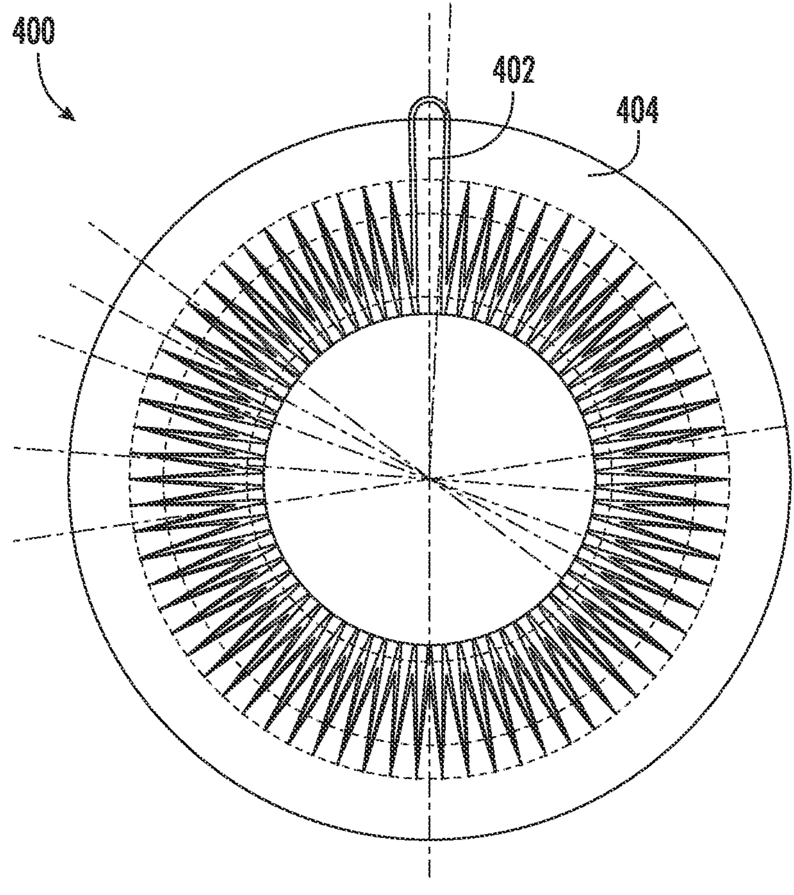
FIG. 5 is a schematic diagram of an exemplary "star-shaped" electrode structure according to the invention.
Figure 6:
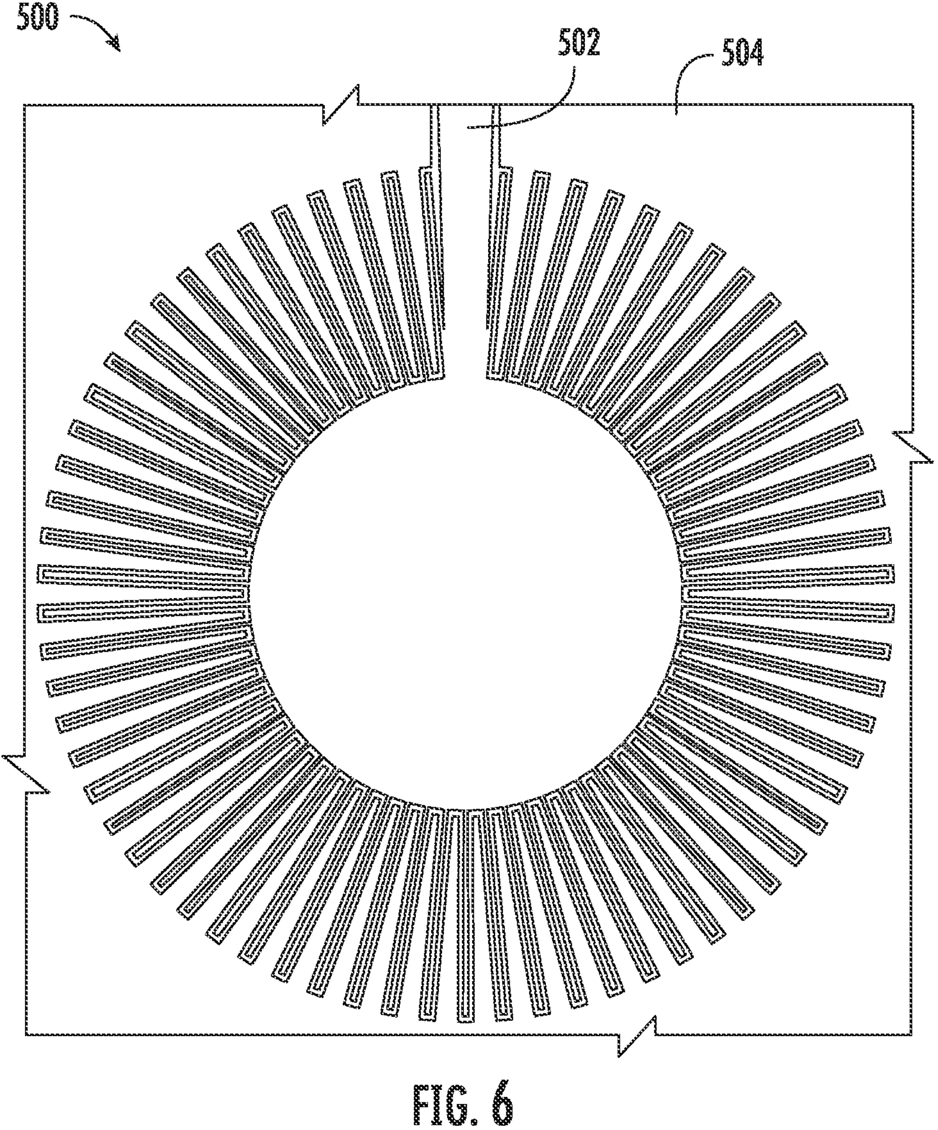
FIG. 6 is a schematic diagram of another exemplary "star-shaped" electrode structure according to the invention.
Figure 7:
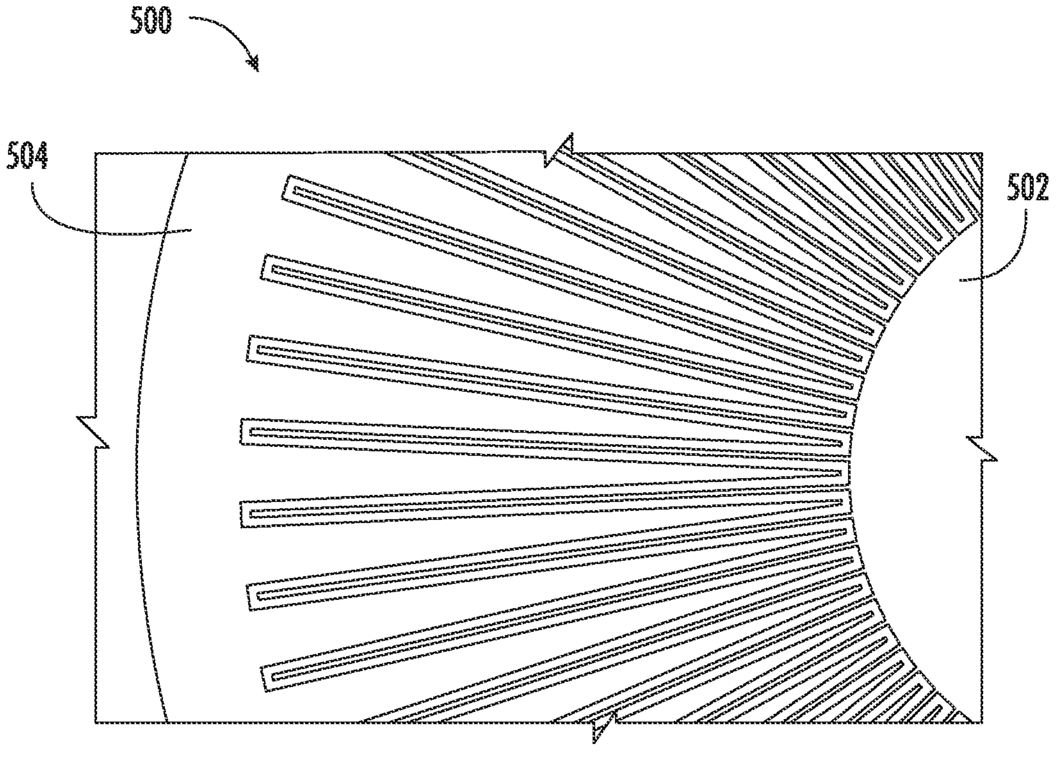
FIG. 7 is an enlarged view of a portion of FIG. 6.

FIG. 5 through FIG. 7 are schematic diagrams of electrodes patterned in a novel "star-shaped" structure.

In the embodiment shown in FIG. 5, the electrode structure 400 includes two electrodes (i.e., a first polarity electrode and a second polarity electrode) 402, 404 which extend in a symmetrical configuration with triangular-shaped inner electrode fingers arranged in a circular shape with the apex of each spoke pointing away from a center of the circular shape, and corresponding interdigitated triangular-shaped outer electrode fingers.

In one implementation, the electrodes are gold.

The electrical resistance of PEDOT:PSS thin film varies when exposed to deformation. A PEDOT:PSS layer and the electrode structure establish a conductive circuit the resistance of which changes when the sensor strains. This resistance change is due to piezo-electric effect of the polymer and geometric deformations of the spokes. The electrode structure enhances piezoresistive behavior of the PEDOT:PSS using shorter distances among measurement points. Consequently, higher densities of electrical contacts as well as thinner PEDOT:PSS films result in higher sensor sensitivities. Other factors influencing the gauge's sensitivity are the length and width of the spokes as well as the spacing between the two polarities.

FIG. 6 and FIG. 7 show another embodiment of a micropatterned star-shaped (SS) electrode structure 500. In the electrode structure 500, electrodes 502, 504 extend in a symmetrical configuration with rectangular-shaped inner fingers arranged in a circular shape with the apex of each finger pointing away from a center of the circular shape, and corresponding interdigitated outer electrode fingers. The rectangular-shaped inner fingers allow the spacing between the inner fingers and the outer fingers to be consistent throughout the structure.

Figure 31:
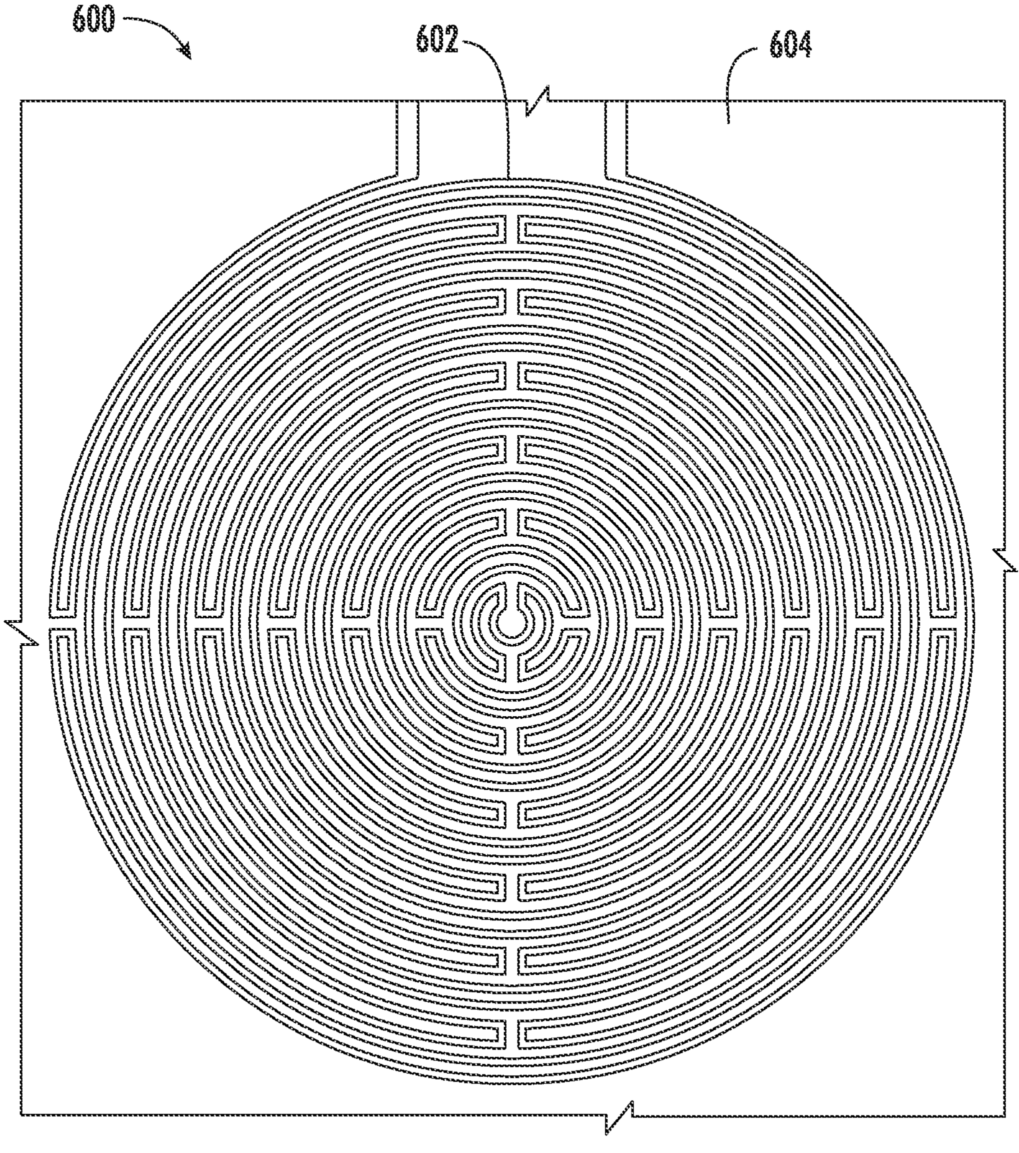
FIG. 31 is a schematic diagram of an exemplary "circular tree-shaped" electrode structure according to the invention.
Figure 32:
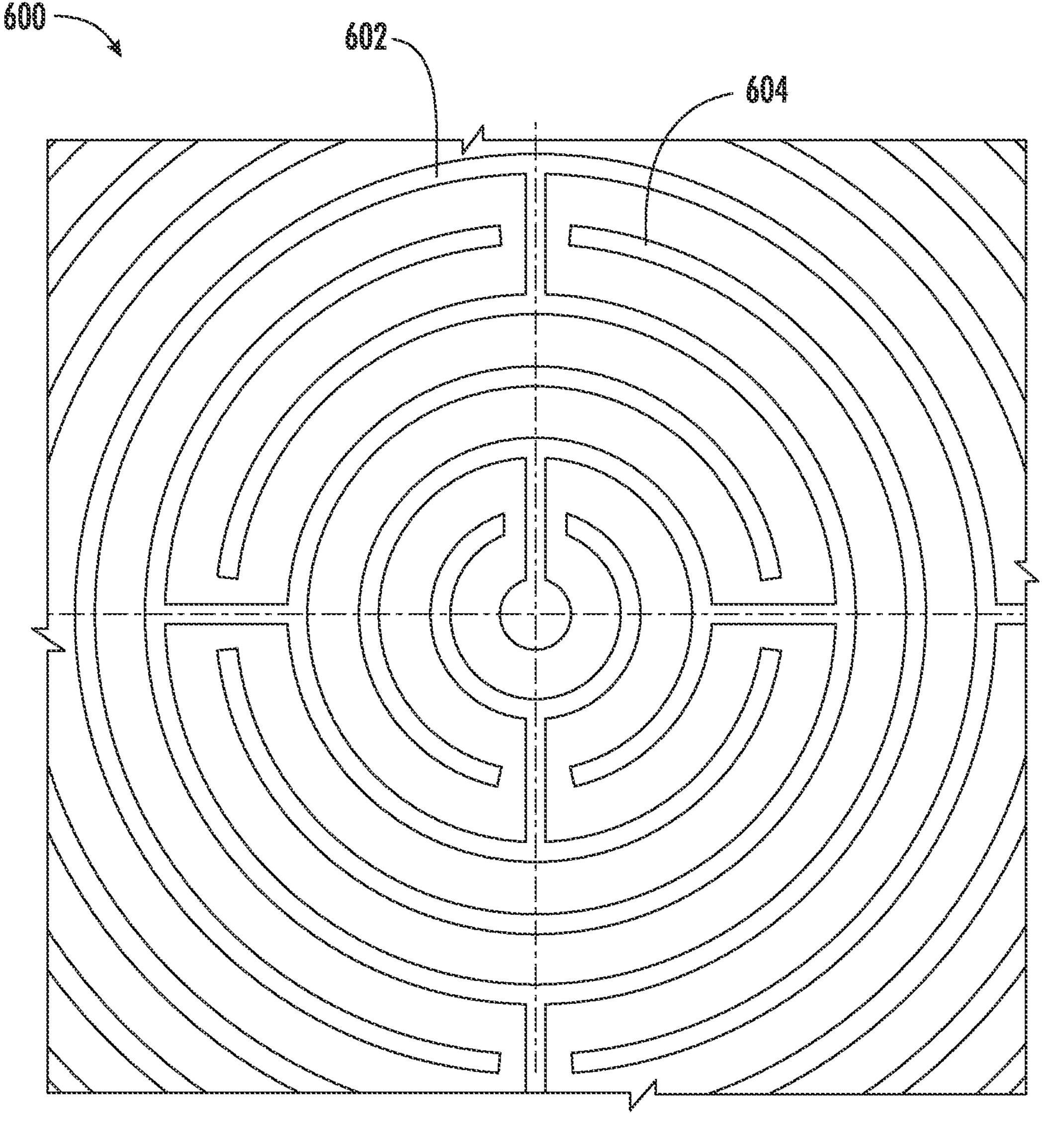
FIG. 32 is an enlarged view of a portion of FIG. 32.

FIG. 31 and FIG. 32 show an embodiment of electrodes patterned in a novel "circular tree-shaped" structure 600, including electrodes 602, 604. In this embodiments, each electrode is patterned in arc-shaped sections, such that opposing arc-shaped sections of the two electrodes are interdigitated.

Figure 33:
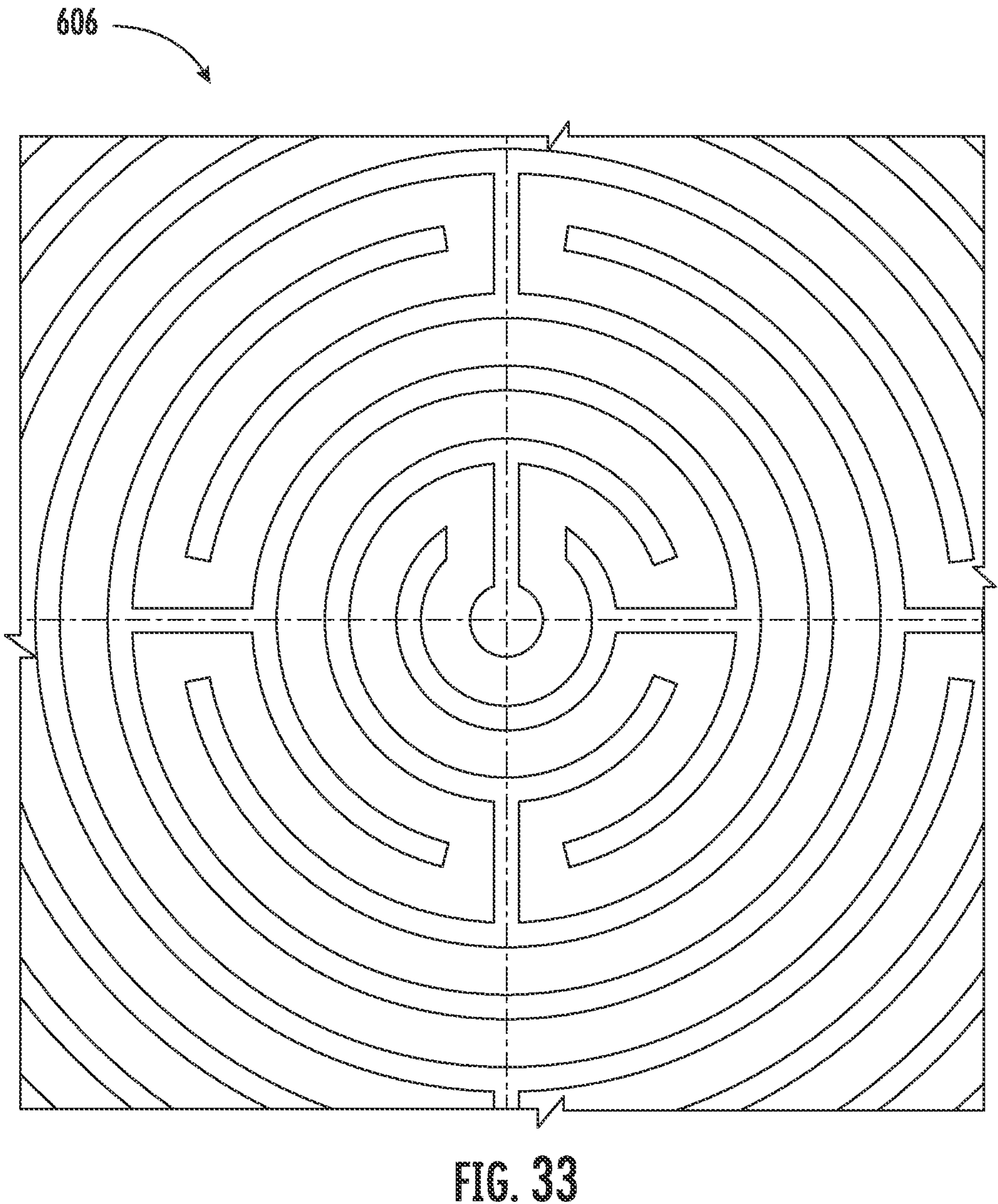
FIG. 33 through FIG. 35 are enlarged views of alternative configurations of exemplary "circular tree-shaped" electrode structures according to the invention.
Figure 34:
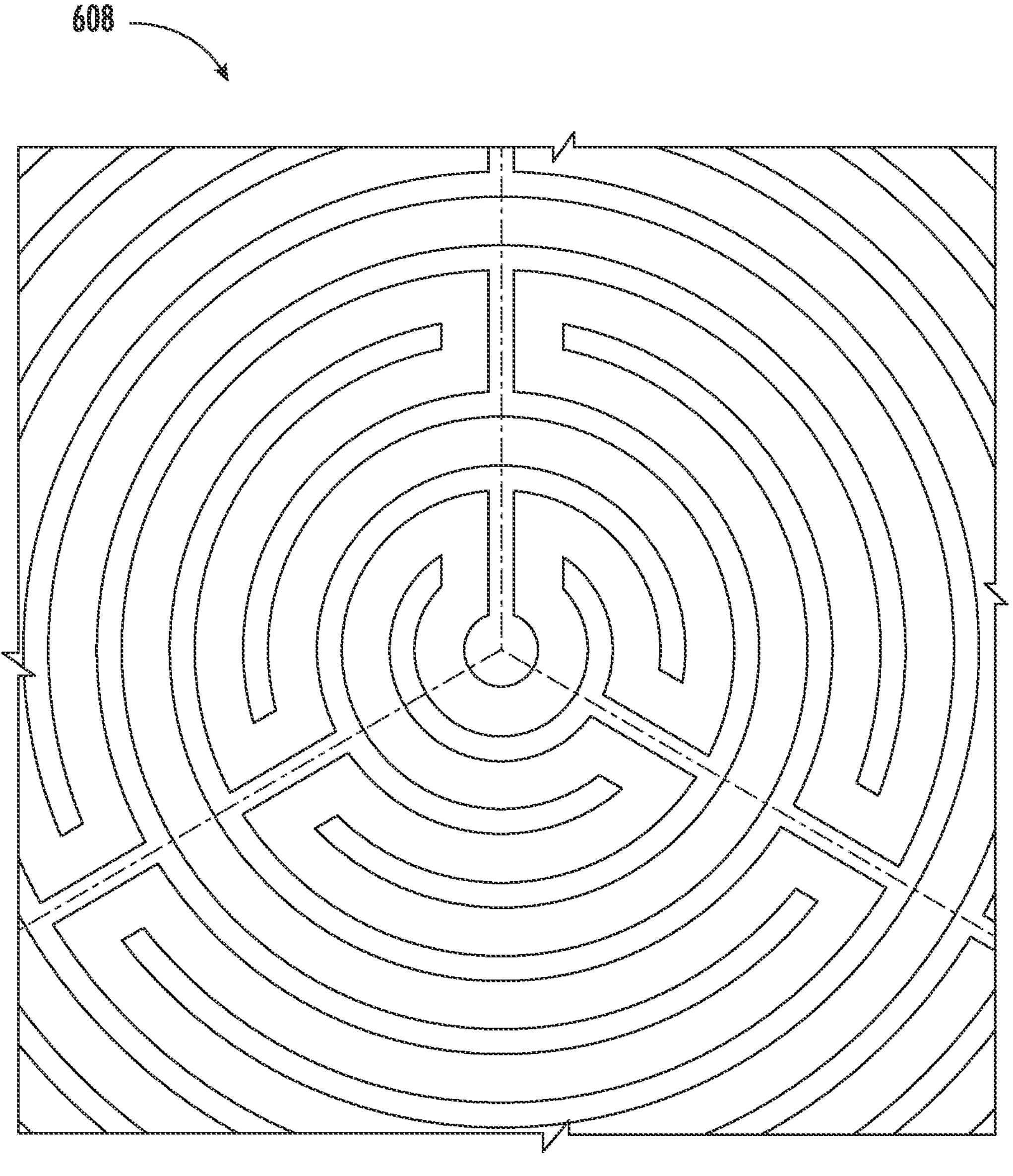
Figure 35:
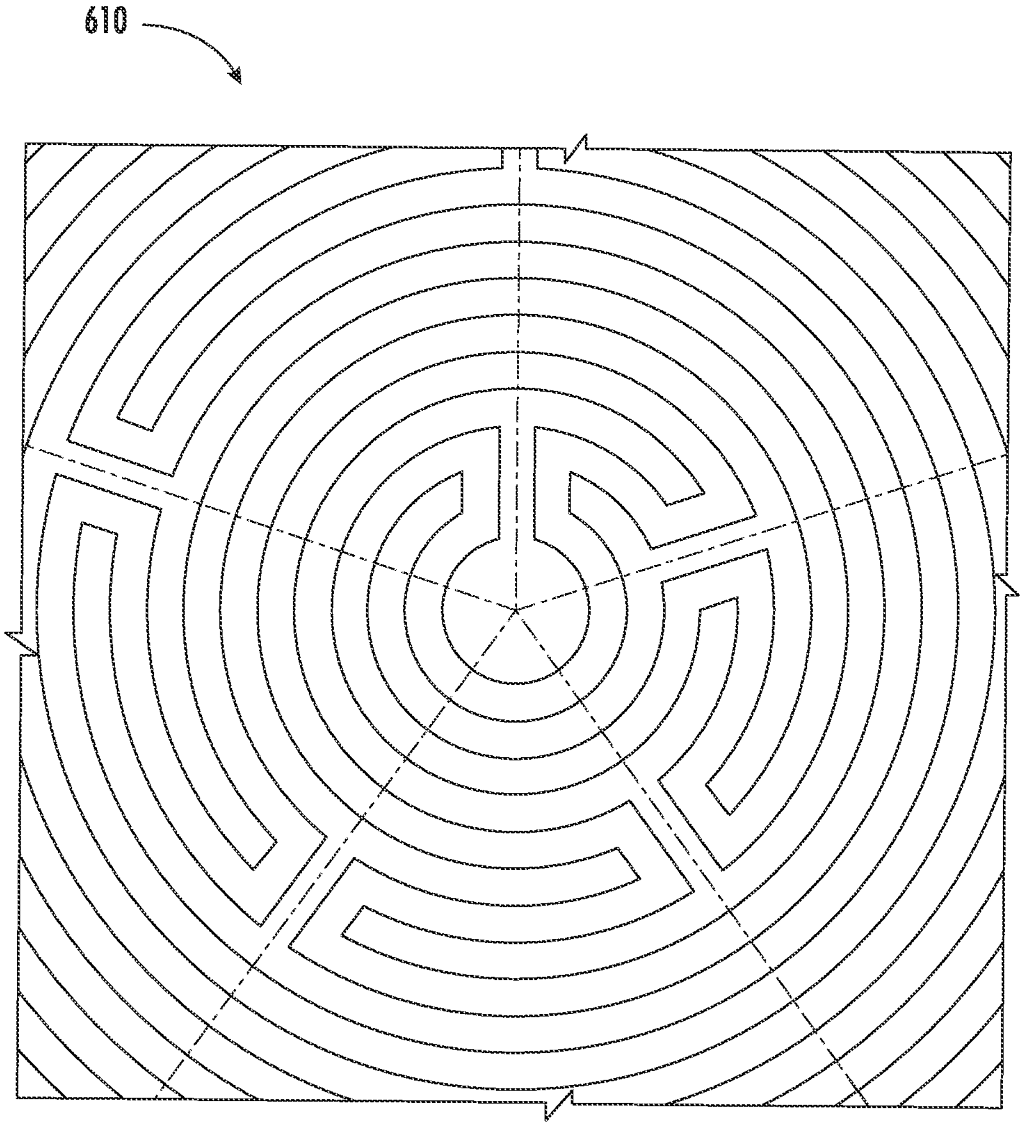

FIG. 33, FIG. 34, and FIG. 35 show alternative configurations of "circular tree-shaped" embodiments 606, 608, 610.

4. Polymer Encapsulation

It is necessary to package sensors in an elastic membrane to allow for deformation to occur in the strain gauges. In addition, an encasing polymer also acts as an applied force diffusion layer affecting the resulting strain and performance of the sensor. Much work has been involved in understanding the performance of these combinations in relation to use with strain gauges. The idea of this is to create an elastically deformable membrane, engineered with a particular strain gauge configuration to achieve repeatable and reliable force data. The concept circles around the idea that if gauges are placed in a particular way within the membrane, then effectively the deformation (in any axis) can be measured. Another advantage to this concept is it's simple to construct and can provide a plethora of useful data. Described below is a multi-step casting process to over mold elastomer and subsequently encase the sensors in a continuous piece of Silicone. In one implementation, RTV silicone rubbers and Frubber® are used to enclose the sensor. RTV polymers are inert and have high elongation, high tear strength. In some implementations, a silicone based membrane composed of Dow Corning 4250-S polymer is utilized, due to its ease of casting, low cost and good chemical stability.

FIG. 8 through FIG. 12 are schematic diagrams of the steps for fabricating an exemplary polymer-encased pressure sensor, including a base membrane mold 700 (a pair of base membrane molds are shown formed in a single substrate), a silicone base membrane 702, a completion mold 704*a*, 704*b* with the base membrane 702 and a sensor 706, completion casting 710, and a fully packaged sensor array 712. The exemplary package is designed to be 80 mm×25.5 mm×5.5 mm and drawn in Solidworks. Next, the two molds were 3D printed in a FormLabs SLA printer and coated with approximately 10 microns of Parylene C to act as a mold release agent and to prevent the cured SLA resin from inhibiting catalysis of the silicone. RTV-4250 is thoroughly mixed (by weight) in a 10:1 ratio (Polymer base:curing agent), and allowed to degas under vacuum for at least 15 minutes or until little to no bubbles are visible. The polymer is heat accelerated cured at 75° C. for one hour.

Figures 8, 9, 10, 11, 12:
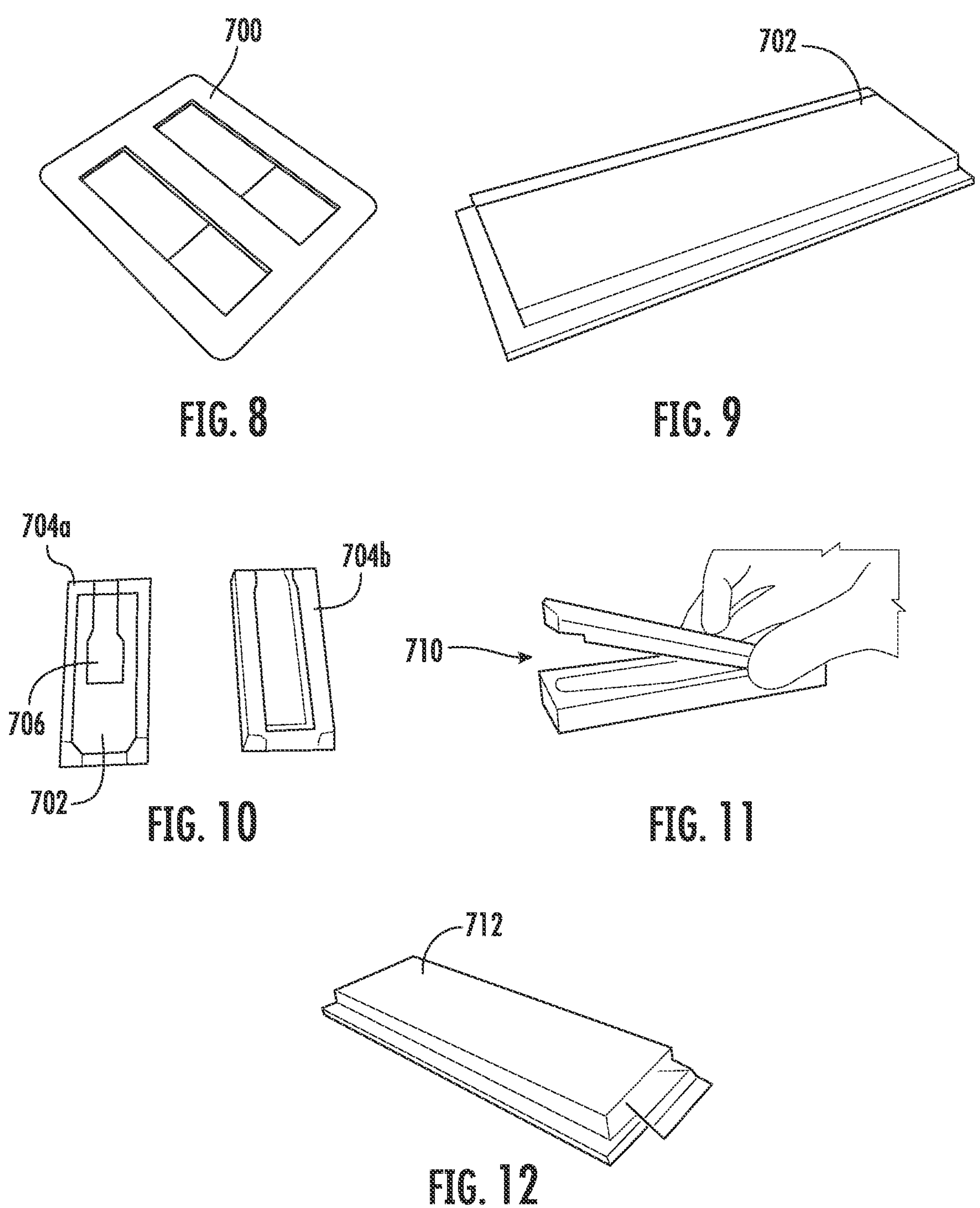
FIG. 8 through FIG. 12 are schematic diagrams of the steps for fabricating an exemplary polymer-encased pressure sensor, according to the invention.

Thus, the sensor array 712 is packaged in the steps as follows: 'base' membrane 702 is casted (FIG. 8, FIG. 9), the sensor array 712 is mounted on the base membrane 702 and placed in the completion mold 704*a* (FIG. 10), completion mold 704*b* is filled with silicone, and then the completion mold 704*a*, 704*b* is pressed together (FIG. 11) and cured to form final packaged sensor array 712 (FIG. 12).

5. Method of Fabricating a Robot Skin Apparatus

Figure 13:
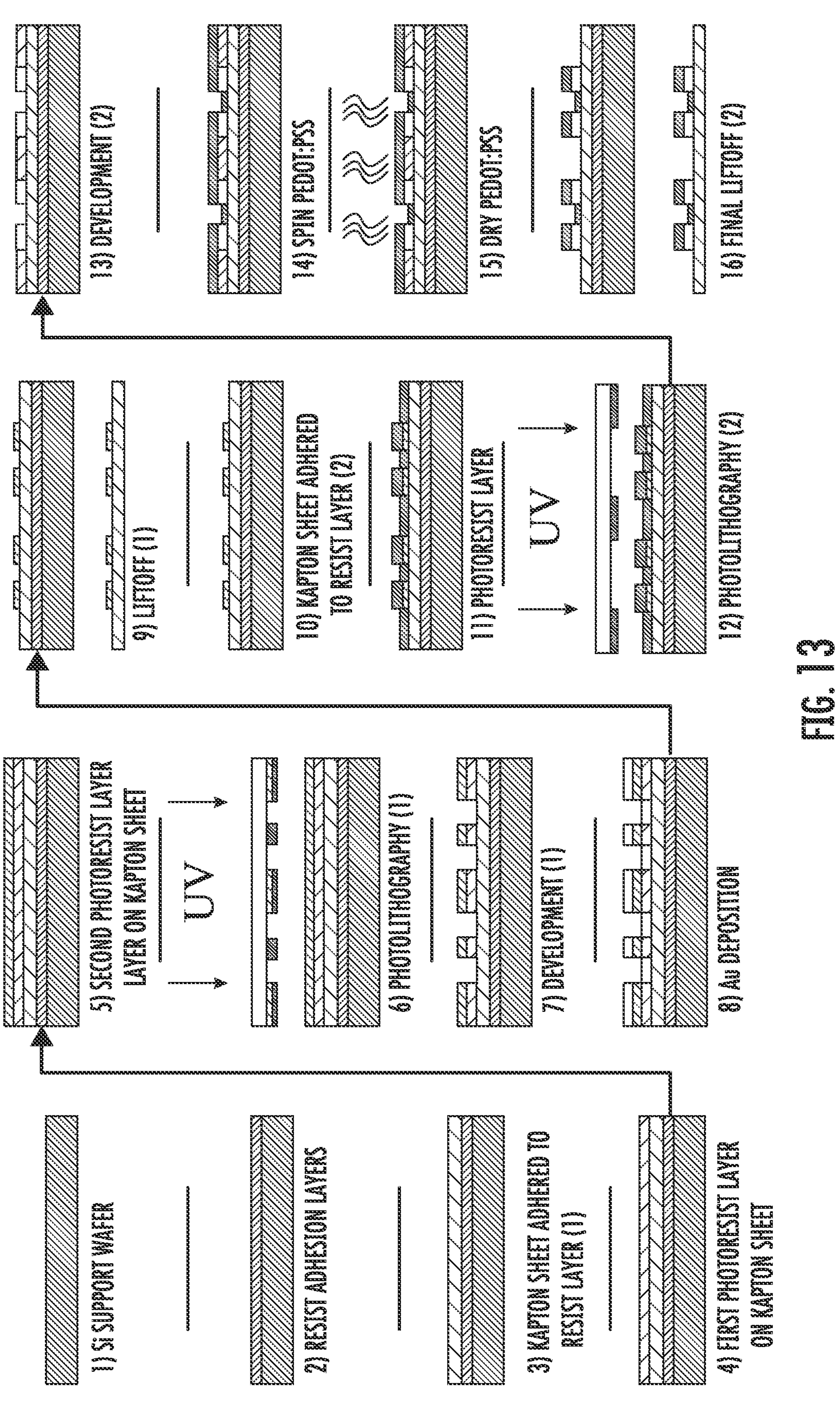
FIG. 13 is a chart of an exemplary method of fabricating a pressure sensor according to the invention.

FIG. 13 is a chart of an exemplary method of fabricating a robot skin apparatus according to the invention, leading to one or more force sensors (strain gauges) patterned over 300 nm thick gold traces on a 100 um thick Kapton sheet. This process uses a carrier wafer to support the Kapton through processing. Optimally, a polyamide precursor is spun onto a wafer avoiding the backing of pre-purchased, extruded Kapton; therefore providing higher quality and consistent micropatterned structures. Advantageously, E-beam and sputter deposited thin films are inspected under SEM and optical profilometry, and special attention is paid to avoid cracks. Au is sputtered directly onto Kapton and, advantageously, the films will not fracture when the substrate is bent to a 5 mm radius. The overall exemplary method involves the following steps.

PEDOT:PSS is a conventional piezoresistor with a reported 1:20 gauge factor, that has been studied extensively in the past. Sensor performance, however, is considerably influenced by the sensor material thickness and placement. Deposition and patterning of PEDOT:PSS mixtures has been investigated. Traditionally, lift-off is difficult with organic materials due to issues with adhesion during pattern definition. As discussed below, different types of PEDOT solutions were formulated to test spin quality and wettability of various mixtures with solvents (Methanol, Dimethyl sulfoxide (DMSO), N-Methyl-2-Pyrrolidone (NMP) to obtain desired viscosity, surface tension and conductivity.

Step 1: First, a clean Silicon carrier wafer is obtained and coated with MicroChem SPR-220-3.0 photoresist.

Step 2: A stock sheet of Kapton is cut to an appropriate size and cleaned with Acetone and Isopropyl alcohol. This is then aligned on the carrier and transferred to a hotplate at 115 degrees Celsius, where the Kapton is covered with a cleanroom wipe and laminated using a brayer. This wafer is removed and allowed to cool. The Kapton is then blown with N2 to remove any particulates. A bi-layer resist composed of MicroChem LOR10B and SPR220-3.0 were spun onto the wafer for patterning the electrodes.

Step 3: After exposure, the wafer is hard baked at 115 Celsius for 60 seconds, the wafer is loaded into a mask aligner and exposed for 11 seconds.

Step 4: The wafer is then post-exposure-baked at 115 Celsius for 60 seconds and developed, dried, and cleaned using Reactive Ion Etching (RIE) set at 50 watts with a 20 SCCM flow rate of Oxygen for 45 seconds.

Step 5: The carrier wafer and patterned Kapton is then transferred to a sputter deposition system (Lesker PVD 75) where 300 nm of Gold is deposited. The coated wafer and substrate are then placed in an Acetone liftoff bath where it is sits in a sonicated bath for approximately 20 minutes. The substrate detaches from the carrier and rinsed several times with Acetone and Isopropyl alcohol before further processing. The Kapton sheet containing the interdigitated structures is then adhered to a new carrier wafer following the same procedure as previously mentioned. Following this step, substrates are again cleaned with N2 and RIE.

Step 6: Next, a single layer of thin 1805 resist is spun onto the devices, hard-baked and exposed in a mask aligner. The wafer is then post-exposure-baked, developed, dried, and cleaned using Reactive Ion Etching (RIE) in a lower power oxygen plasma.

Step 7: Next the PEDOT:PSS based solution is spun onto the wafer at 2000 rpm, now with windows over the interdigitated structures. The wafer is then allowed to dry under vacuum in a convection oven. Finally, the wafer is transferred to a lift-off bath containing Acetone and allowed to sit for about 15 minutes while undergoing agitation. After the Kapton departs the carrier it is rinsed several times with acetone and IPA. The PEDOT:PSS is now patterned over the ID structures and microfabrication steps are complete.

Advantageously, the wet lithography (deposition and patterning of PEDOT:PSS films) provides thin film layers (under 1 micron), whereas PEDOT:PSS polymer is normally designed for inkjetting thicker films which are less sensitive. PEDOT is mixed with a solvent to allow it to be lithographically defined. PEDOT:PSS based inks and formulas available commercially are rarely suitable for use straight out of the bottle. Most PEDOT:PSS containing colloidal mixtures must be tailored to meet requirements necessary for the method of deposition (whether a form of printing, stenciling, or spinning), as well as what material (or materials) the PEDOT ink will be deposited on. In the exemplary embodiments described herein, two major requirements must be tuned based on the use of Kapton and Gold, as well as the spin coating method of deposition. Firstly, most PEDOT ink comes suspended in water which is typically undesirable for uniform spinning on metal or polymers. The first goal is to increase the wetting of PEDOT inks to improve coating uniformity. The preferred solvents that are DMSO and alcohols (specifically Methanol). While DMSO and Methanol improve wettability, the next issue is how these solvents affect the deposition process. In the case of spin coating and definition by patterned photoresist, alcohol (or methanol) solvated ink is preferred because it is compatible with the preferred photoresist (at least the MicroChem SPR series resists), whereas DMSO will dissolve the photoresist and not allow a pattern to be defined.

Furthermore, in some cases it is desired to augment the viscosity and electrical properties of the PEDOT:PSS inks. In this case, Polyvinylpyrrolidone (PVP) is an preferred material for both tailoring viscosity and increasing the resistance of the mixture. One must be careful with the addition of PVP because of its insulating properties at a particular percentage rendering the previously DC conductive PEDOT films insulative and only AC conductive. The inventors have demonstrated functional PEDOT/PVP mixes solvated with both Methanol and DMSO with ratios as high as 1:2 of PVP to PEDOT.

In addition to the longer electrode lengths and smaller electrode separations (i.e., resulting in higher densities of electrical contacts) providing higher sensitivities, as discussed above, thinner film layers of the flexible piezoresistive film (e.g., PEDOT:PSS) also contribute to higher sensitivities by providing a greater response to strain. Further, whereas, lift-off is traditionally difficult with organic materials due to issues with adhesion during pattern definition, the wet lithography process described above eliminates those issues, allowing patterning of the piezoresistive film only over the interdigitated structure without the traditional lift-off difficulties.

6. Temperature-Compensated Assembly

In general, strain gauges are temperature sensitive. Thus, in order to compensate for operation in varying temperatures, another exemplary embodiment of the invention includes a novel temperature-compensation structure and technique. This technique involves a double-sided strain measurement tool including two separate pressure sensors on the opposite sides of a plane.

Figure 14:
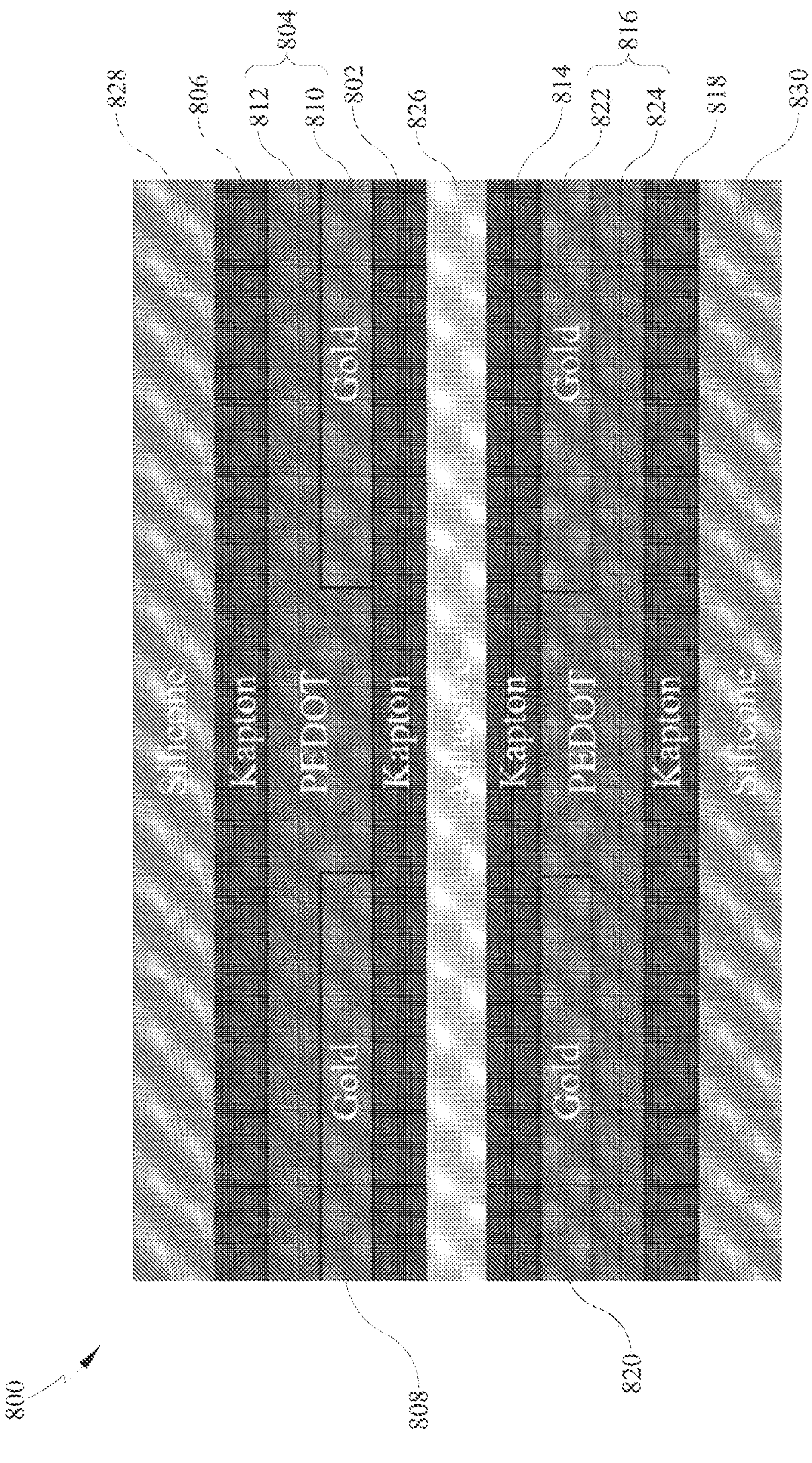
FIG. 14 is a schematic sectional diagram of an exemplary temperature-compensated assembly according to the invention.

FIG. 14 is a schematic sectional diagram of an exemplary temperature-compensated assembly 800, including a first flexible substrate 802, a first pressure sensor 804, a first flexible covering layer 806. The first pressure sensor 804 includes a first electrode 808 and a second electrode 810 in spaced relationship and symmetrically patterned on the first flexible substrate 802 to form a substantially circular peripheral boundary, and a flexible piezoresistive film 812 covering the first electrode 808, the second electrode 810, and the space therebetween to form a circuit therewith having a resistance varying with a strain on the flexible piezoresistive film 812. The first flexible covering layer 806 covers the first flexible substrate 802 and the first pressure sensor 804. The exemplary temperature-compensated assembly 800 also includes a second flexible substrate 814, a second pressure sensor 816, and a second flexible covering layer 818. The second pressure sensor 816 respectively includes a first electrode 820 and a second electrode 822 in spaced relationship and symmetrically patterned on the second flexible substrate 814 to form a substantially circular peripheral boundary, and a flexible piezoresistive film 824 covering the first electrode 820 and the second electrode 822. The second flexible covering layer 818 covers the second flexible substrate 814 and the second pressure sensor 816. The second flexible substrate 814 is adhered back-to-back with the first flexible substrate 802 by an adhesive layer 826, such that the second pressure sensor 816 is in an opposing relationship with the first pressure sensor 804. Polymer membranes 828, 830 encapsulate the components.

Figure 15:
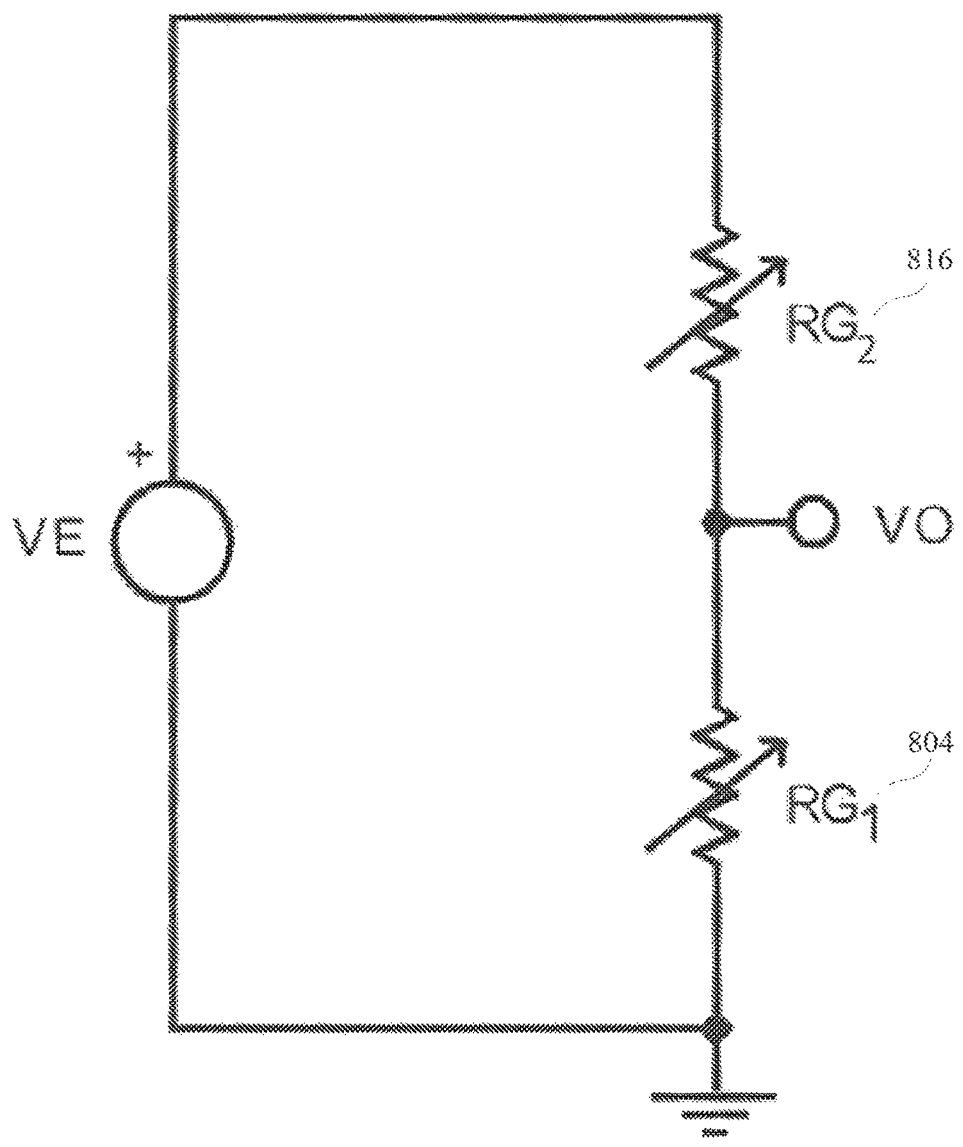
FIG. 15 is a circuit schematic of an exemplary Wheatstone half-bridge with two pressure sensors according to the invention.

The two individual pressure sensors 804, 816 are then configured as a Wheatstone half-bridge, as shown in FIG. 15. Since both gauges are at the same location, they experience identical ambient temperature. Therefore, any temperature variations influence them in the same direction and with the same ratio of resistance variation. The output voltage, $V_o$, is therefore invariable to these fluctuations. This configuration, interestingly, brings about a two-fold sensitivity to strain as well. Since the two sensors 804, 816 are on the opposite sides of each other, a strain deformation causes elongation in one and a shrinkage in the other. In other words, the resistance of one of the gauges increases while that of the other one decreases. Therefore, the output voltage, $V_o$, is double sensitive to a same geometric deformation.

7. Apparatus Including an Array of Sensors

Figure 16:
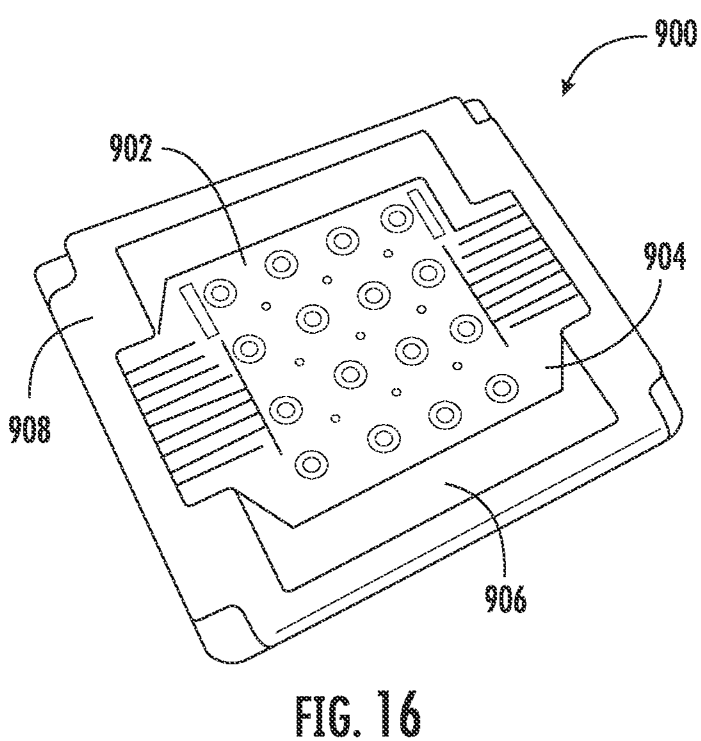
FIG. 16 is schematic diagram of an intermediate assembly of an exemplary robot skin apparatus including an array of sensors.

In another embodiment as shown in FIG. 16, an exemplary robot skin apparatus 900 includes an array of sensors 902 (e.g., a 4×4, as shown) on a flexible substrate 904, substantially as described hereinabove. FIG. 16 shows the array of sensors 902 on the flexible substrate 904 mounted on a base membrane 906 and placed in ½ of a completion mold 908.

Figure 17:
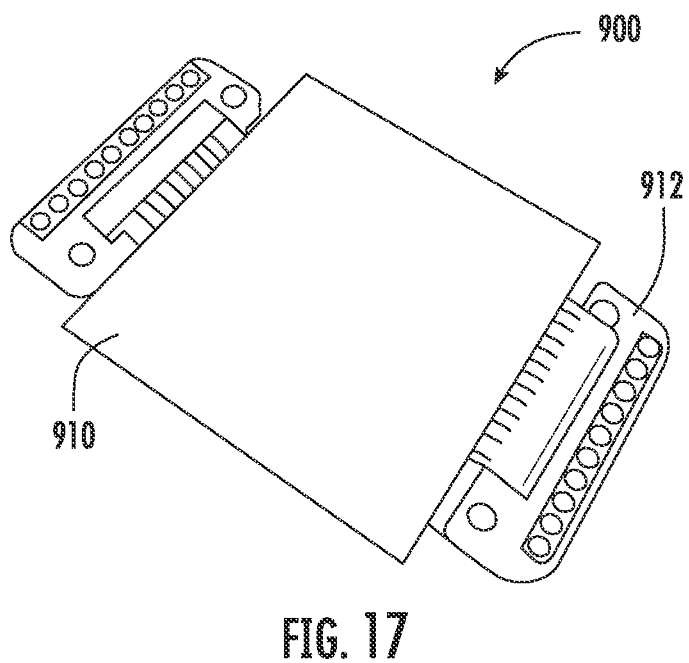
FIG. 17 is a schematic diagram of a final assembly of the exemplary robot skin apparatus including an array of sensors of FIG. 16.

FIG. 17 shows a final packaged sensor array 910 mounted to a circuit board 912 including components of a data acquisition system for measuring the pressures detected by the sensor array 910, as discussed in more detail below.

Advantageously, in conjunction with the mechanical dampening/force dispersion of the polymer membranes, by engineering the pressure sensors in particular positions in an array within a deformable object, a 3D representation of deformation can subsequently be created-thus, effectively making the robot skin apparatus a shape sensor. Another advantage to this is that by measuring deformation by way of pressure sensors, it is possible to decrease the number of sensing tactels and rely on mechanical cross-talk to approximate the value of strain, and thus force, between the tactels.

Figure 18:
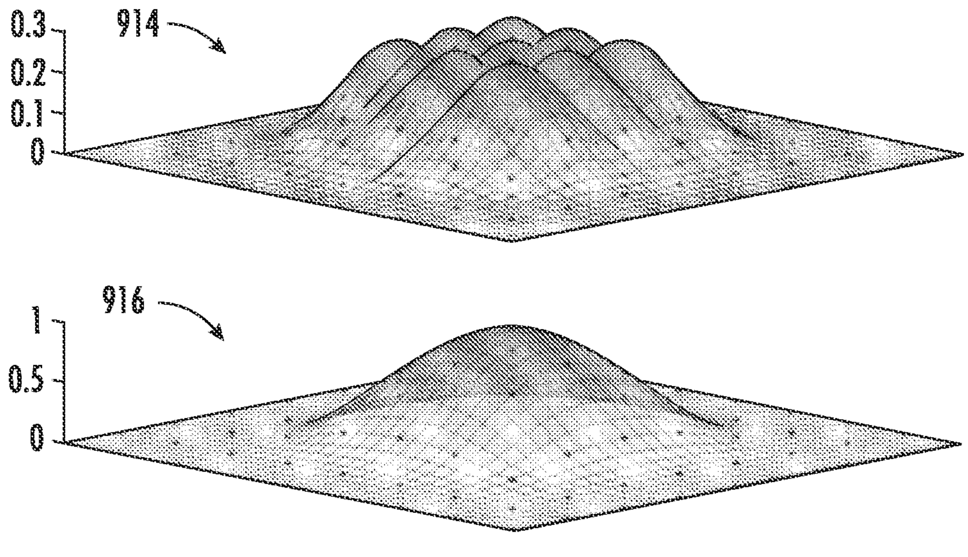
FIG. 18 are force dispersion graphs of a robot skin apparatus including an array of sensors and a graph of the total force profile.

FIG. 18 shows exemplary force dispersion graphs of a robot skin apparatus including an array of sensors (top graph 914) with each pressure sensor applying a Gaussian force distribution, which are then summed to obtain the total force profile (bottom graph 916).

8. First Data Acquisition System for Measuring Pressure

When force is applied onto a single sensor, the resistance will vary according to the magnitude of the force. Normally, this variance is rather small—below 100 mΩ. The sensor array described above includes a plurality of pressure sensors on a single substrate. In this case, due to fabrication process limitations, the sensor resting resistance varies among each and every one of the plurality of pressure sensors, necessitating a system and method for compensating for the varied resting resistances of the plurality of pressure sensors when measuring a force (i.e., a pressure).

Figures 19, 20:
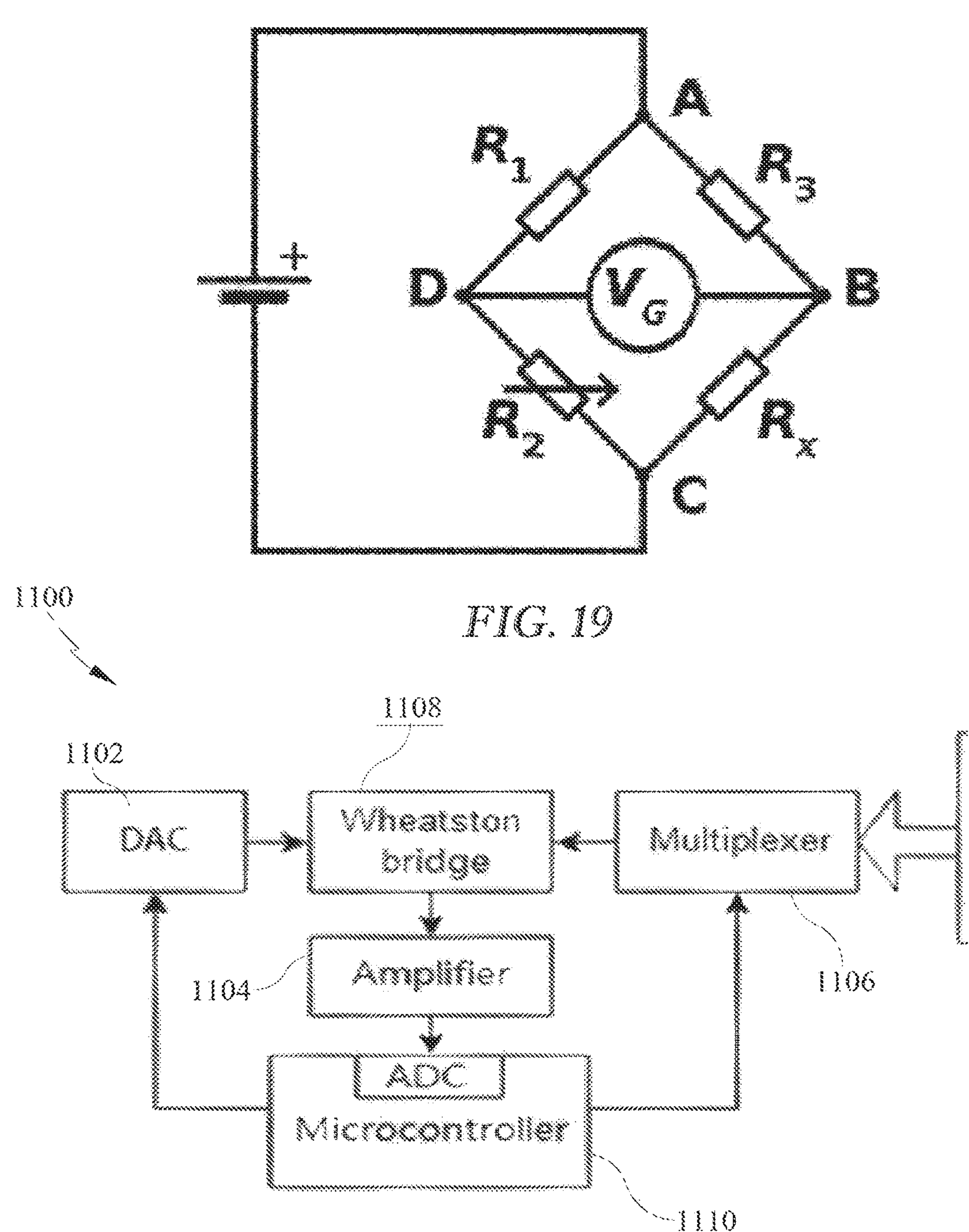
FIG. 19 is a circuit schematic of a Wheatstone bridge circuit.
FIG. 20 is a block diagram of an exemplary modified Wheatstone bridge/data acquisition circuit according to the invention.

A Wheatstone bridge circuit, as shown in FIG. 19, is widely used to detect resistance change in pressure sensors. Because of the challenges stated before, to detect the resistance change of each single sensor from a sensor array, modifications to the conventional Wheatstone must be made.

A classic Wheatstone bridge circuit contains 2 known resistors ($R_1$ and $R_3$), a variable resistor ($R_2$) and a testing resistor ($R_x$) that structured in diamond shape configuration shown in FIG. 18. To measure the resistance on $R_x$, tune $R_2$ until $V_G$ shows 0V—the bridge is called balanced. then $$R_x = \frac{R_2}{R_1} \cdot R_3.$$

In the case of a single sensor, the user can connect a single sensor to $R_x$ and balance the bridge by a potentiometer. Later, any change on the resistance of $R_x$ is reflected on the change of $V_G$, which can be detected by an analog to digital converter (ADC) circuit. In this scenario, the $R_2$ can be manually tuned.

When multiple single sensors been arranged into a sensor array, manual tuning is difficult or require a large board to place all the potentiometers. Also, since the sensor resting resistance varies between different single sensors due to process limitation, it is also impossible to use a fixed $R_2$ to fit all single sensors.

FIG. 20 is a block diagram of an exemplary modified Wheatstone bridge/data acquisition circuit according to the invention which is used to measure a sensor array. The essence of the classic Wheatstone bridge circuit is create a reference voltage on one path to meet the voltage on the other: the voltage on B is tuned to be equal to D from FIG. 19. Instead of using a potentiometer, a high precision digital to analog converter (DAC) is used to create the reference voltage. When no force is applied, an instrument amplifier is connected between B and D to amplify and measure the voltage difference: when the difference is theoretically zero or practically small, the bridge is balanced. This is the baseline of the sensor. With force applied to the sensing area, the resistance variance on the sensor breaks the balance and a voltage is generated between B and D. By amplification, this voltage can be read to decide how much the resistance is changed. Since the sensor array has many single sensors, an analog multiplexer is used to selectively provide power to each single sensor.

To replicate this design, an exemplary system includes a high-resolution DAC 1102, an instrument amplifier 1104, an analog multiplexer 1106, a measurement circuit 1108, and a micro-controller (MCU) 1110 to control the signal flow and collect data. In this work, AD5664R from Analog Device® is used as the DAC, it has four independent output channels, each channel has 16 bits of accuracy; a designated pin to accept external reference voltage and a SPI bus interface to communicate with a MCU. AD623 from Analog Device® is used as the instrument amplifier, the gain is tunable from 2 to 1000 by a single resistor. ADG731 is a 32-channel multiplexer from Analog Device®, it has low on-resistance and low on-resistance variance between channels. Data collection and IC communication is handled by dsPIC33EP512MC806 micro-controller from Microchip. It has a 70 Mhz clock providing adequate processing power, SPI bus interface to communicate with the DAC and multiplexer and built-in ADC circuit to read result from the instrument amplifier.

Figure 21A:
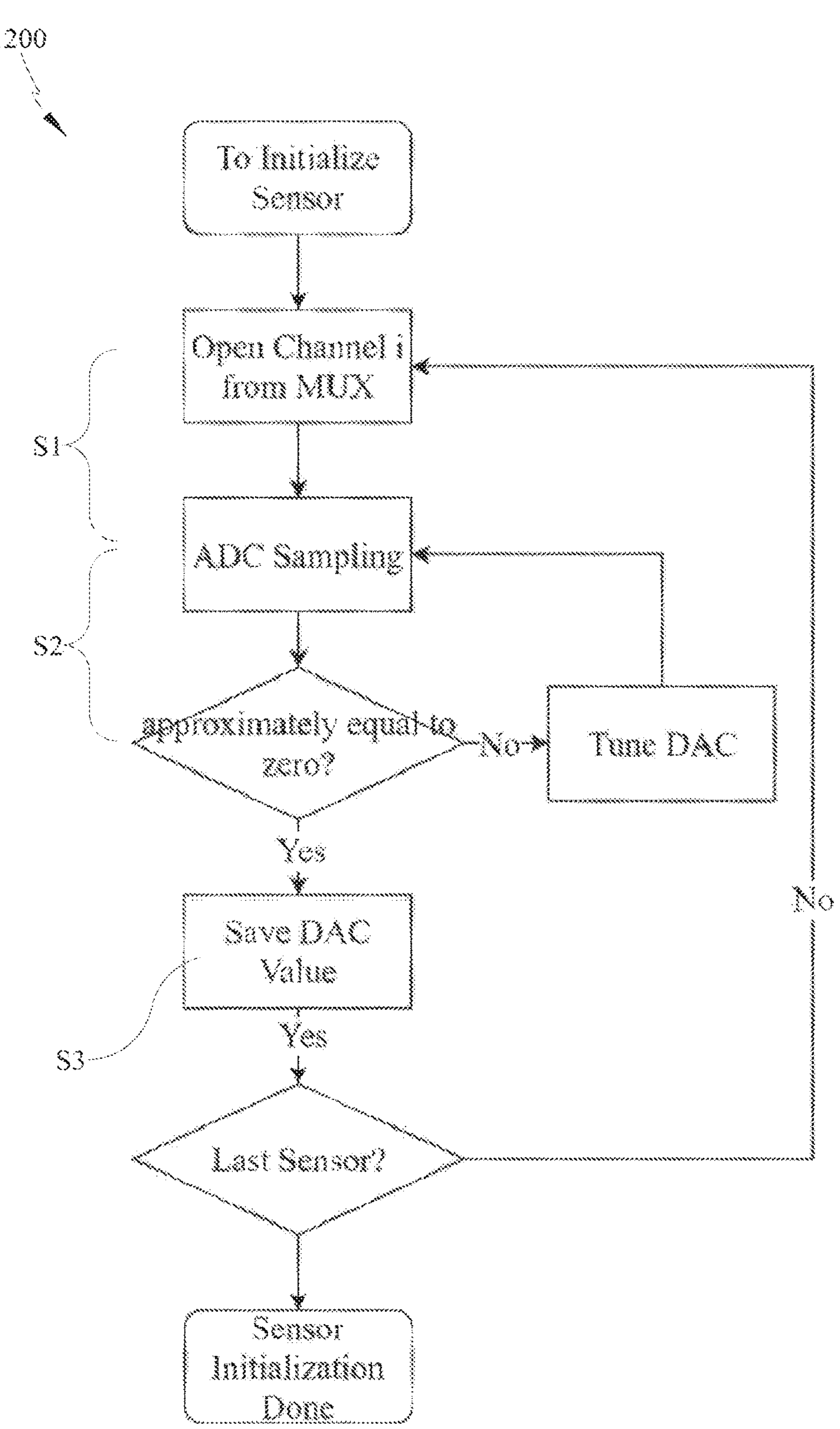
FIG. 21A and FIG. 21B, is a flow chart of an exemplary method of measuring pressure applied to an array of sensors.
Figure 21B:
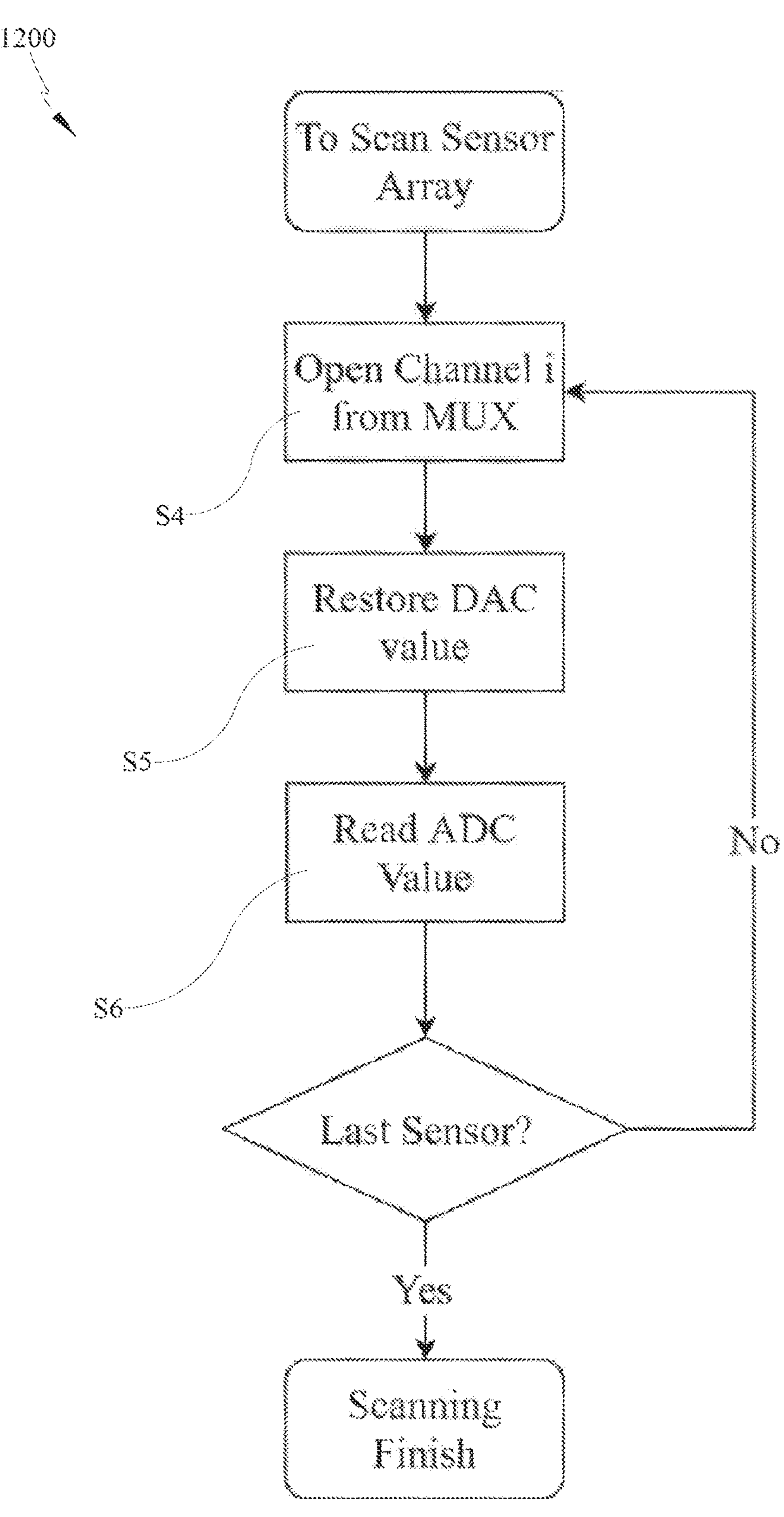

FIG. 21A and FIG. 21B are a flow chart of an exemplary method 1200 of measuring pressure applied to an array of sensors, including: step S1, the multiplexer opens a channel causing power to be applied onto a corresponding sensor, with no force applied, and the instrument amplifier detects a voltage difference on its input, the MCU reads this voltage from its own ADC module; step S2, the MCU drives the DAC to output a matching voltage to balance the bridge. Once the bridge is balanced, in step S3, the MCU records this voltage as baseline of that single sensor. This process is repeated until all sensor baselines are recorded to finish initialization process. To detect an applied force, in step S4, the MCU sequentially opens a channel on the multiplexer for each sensor, and, in step S5, loads each corresponding baseline value back to the DAC. In step S6, both the sensor voltage and reference now is present to the instrument amplifier input and by read back the output from amplifier, one can calculate the resistance change. Also, since the sensors experiencing temperature drift, the MCU can run a high pass filter (moving average filter) to remove the small fluctuation in the collected data due to temperature drift.

9. Second Data Acquisition System for Measuring Pressure

Figure 22:
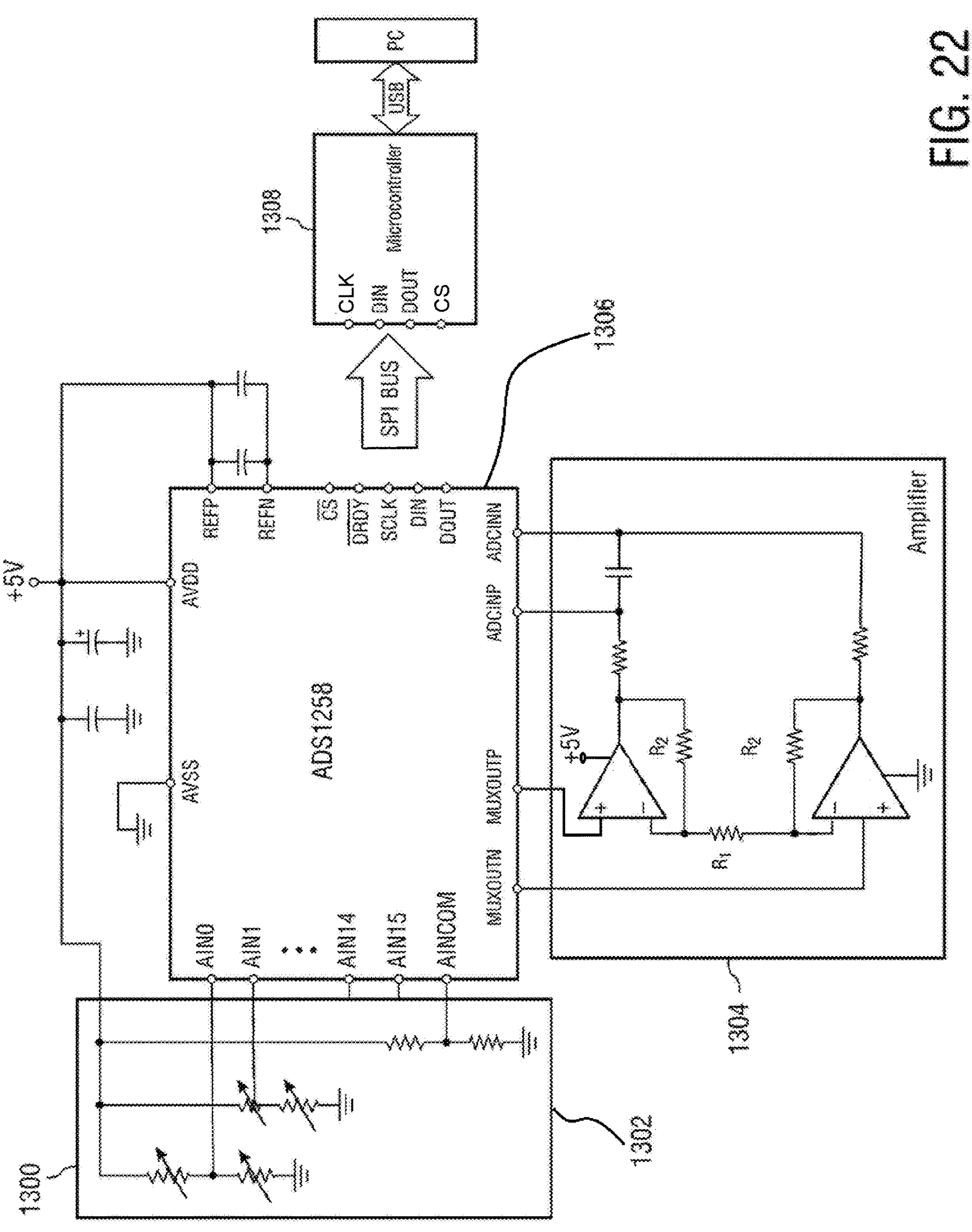
FIG. 22 is a block diagram of another exemplary data acquisition circuit/system for measuring a sensor array

FIG. 22 is a block diagram of another exemplary data acquisition circuit/system 1300 for measuring a sensor array. To measure resistances of the pressure sensors, the data acquisition (DAQ) system 1300 includes a 16-channel (multiplexed), low-noise, 24-bit, ultra-fast, acquisition system that samples 16 paired (i.e., double sided for temperature compensation) strain gauges at its input. The DAQ provides scan rates of up to 23.7k samples per second (SPS) per channel or 1.48 kSPS per array of 16 sensors. The system 1300 includes Wheatstone bridges 1302, bipolar voltage-regulation circuitry, an amplification/conditioning stage 1304 with instrumentation components, and an analog-to-digital converter (ADC) 1306 (i.e., measurement circuitry). The ADC 1306 used is an ADS 1258 from Texas Instruments (TI) which communicates serially with an external microcontroller 1308 via an SPI-compatible interface through a simple command word structure. The ADC 1306 also features bias current sensors that are utilized to bias each sensor sequentially and verify sensor integrity. There is a built-in programmable low-pass digital filter within the ADC that produces a high-resolution digital output. By setting the filter's parameters, a trade-off is made between scan rate and resolution of readings.

An external signal conditioning/amplification stage is used between the multiplexer output pins (MUXOUTP and MUXOUTN) and the input pins (ADCINP and ADCINN) of the ADC 1306, although this amplification stage can be deactivated altogether to measure raw data. Additionally, through the SPI bus commands, the ADC 1306 is commanded to read an internal temperature value, a supply voltage value, and a gain value. The external amplifier 1304 is a differential amplifier with matched op-amps and resistors, to remove the common component of the input signals and to buffer the multiplexer's output for best performance.

10. Pneumatic Gripper Application

Referring again to the exemplary pneumatic gripper 200 shown in FIG. 2, grippers equipped with tactile sensors are very important in high performance robotic manipulation tasks, where the robot must adapt to shape and characteristics of unknown objects. Such adaptability reduces cycle time and cost, eliminates the need for customization and tool changers, and enhances the automation process. In addition, while handling fragile objects, it may be necessary to regulate the grip force to avoid slipping, dropping, or breaking the object being manipulated. The exemplary pneumatic gripper 200 includes robot skin apparatuses 210, 212 positioned on the gripper fingers 202, 204 (e.g., on the gripper "fingertips"). The robot skin apparatuses 210, 212 each include a pressure sensor on a flexible substrate, the pressure sensor including electrodes patterned with a polymer piezo-resistive material. The substrate and sensor are encased in an polymer (e.g., an elastic Silicone) encapsulant. Using feedback from the pressure sensor, a model-free explicit force control scheme is implemented. The exemplary pneumatic gripper 200 including the robot skin apparatuses 210, 212 can maintain a precise control of the force applied and can better accommodate grasp transitions than a traditional pneumatic gripper without such apparatuses.

Figure 23:
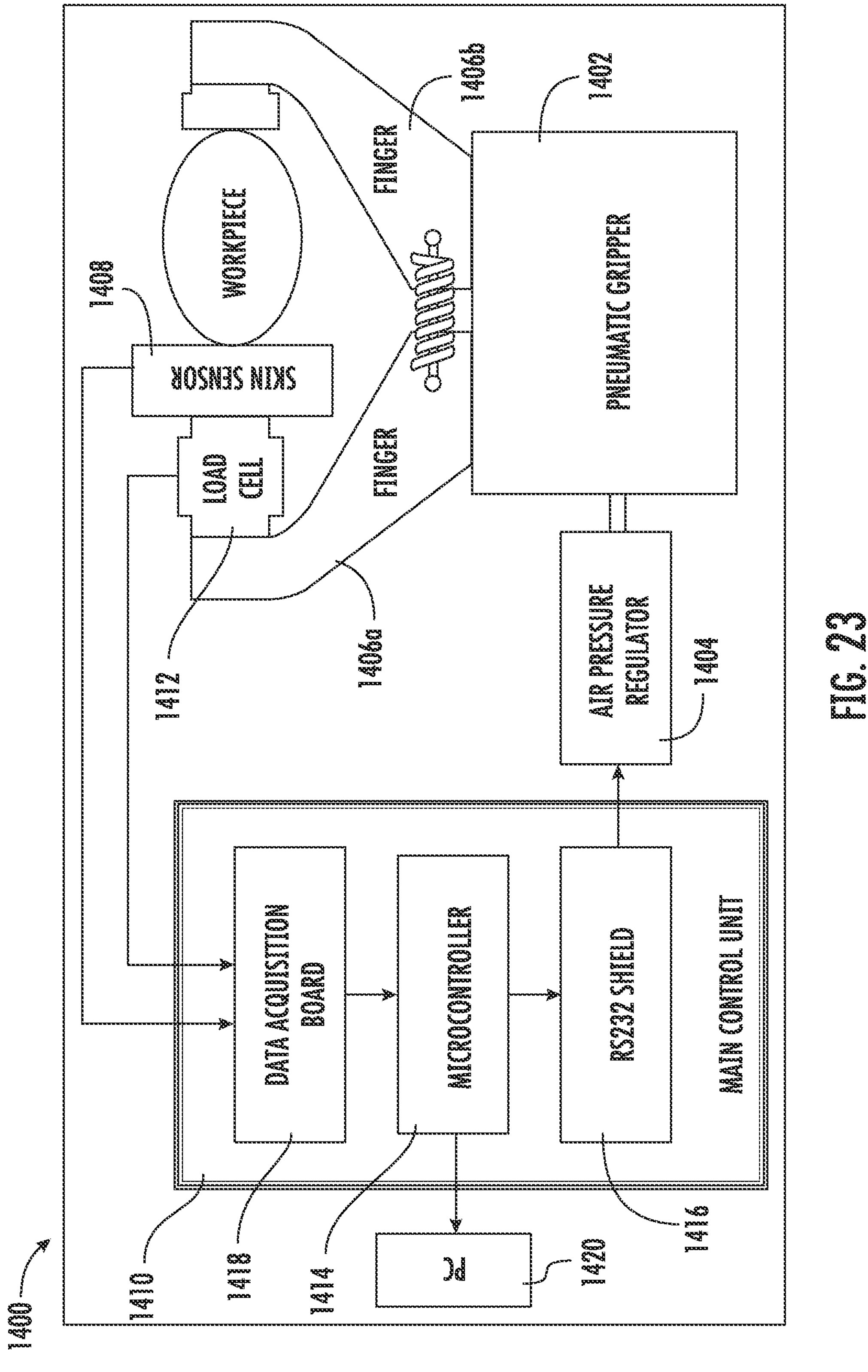
FIG. 23 is a schematic diagram of an exemplary system for precision grasp control with a pneumatic gripper with a robot skin apparatus, according to the invention.

FIG. 23 is a schematic diagram of an exemplary system 1400 for precision grasp control with a pneumatic gripper with a robot skin apparatus. This system 1400 includes a pneumatic actuator 1402, a pressure regulator 1404, custom-made gripper fingers 1406*a*, 1406*b* augmented with a robot skin apparatus 1408, and a main control unit 1410. One example of a pneumatic actuator/gripper fingers device is a Gramforce G8-18-BP from Airpot Corp., USA. Gramforce is a two-finger actuator which features holding forces ranging from 0.25 to 8.6 N, and an 18-mm stroke. It is noteworthy that application of forces below 0.25 N is not achievable with this gripper due to stiction, although this value is exceptionally low for an industrial pressure gripper.

One example of a pressure regulator 1404 is a QPV unit from Proportion-Air, USA. QPV can be commanded through Modbus protocol over RS232 serial port to set air pressures in the range of 0-150 PSI. In this setup, to validate the robot skin apparatus 1408 performance, a commercial load cell 1412 (e.g., a MLP-25 from Transducer Techniques, USA) is also incorporated. The load cell data can be used as a ground truth, and the control laws employed for grasp control of the pneumatic gripper are blind to the load cell readings.

The robot skin apparatus 1408 is a custom-fabricated pressure sensor (i.e., strain gauge) packaged inside a Silicone polymer encapsulant. The pressure sensor consists of micro-patterned gold interdigitated electrodes on a deformable Kapton sheet, a thin piezoresistive ink atop, and a final Kapton isolation layer (see, e.g., FIG. 3 and FIG. 4). The piezoresistive material for the sensor was a variant of PEDOT:PSS which is a flexible piezoresistive polymer. The advantage of this choice of material is the ease of manufacturing and its superior gauge factor ensuring adequate sensitivity. The pressure sensor is fabricated through photolithographic techniques, while PEDOT was patterned on the structure via a novel wet lift-off process discussed above.

After fabrication, the sensor is encapsulated in an elastic membrane to allow for the gauge to deform, and to protect it from the environment. Additionally, an encasing polymer acts as a force diffusion layer improving the resulting strain and performance of the sensor. In order to increase the sensor repeatability, it is mounted on an elastically deformable membrane engineered with a specific strain gauge configuration. A multi-step casting process is employed to over-mold elastomer and subsequently encase the strain gauge in a continuous piece of Silicone. This work primarily employs the use of RTV rubber. RTV polymers are inert, easy to cast, and chemically stable, and feature high elongation and tear strength. To integrate the robot skin apparatus 1408 with the gripper finger 1406*a*, a 'trampoline-like' sleeve (FIG. 24, FIG. 25, and FIG. 26) is used in order to eliminate complex strain effects and improve sensitivity. The space behind the sensor sleeve is physically open so that the membrane can deform into free space, thereby enhancing the sensitivity.

The main control unit 1410 consists of a microcontroller (e.g., an Arduino-compatible ARM microcontroller (Teensy 3.2)) 1414, an output device (e.g., an RS232 shield) 1416, and data acquisition circuitry 1418. In the exemplary embodiment, the RS232 shield converts Teensy's TTL-level UART signals to RS232 level to enable the microcontroller 1414 to command the pressure regulator 1404 through Modbus protocol. The data acquisition circuitry (DAQ) 1418 includes a signal-conditioning stage, low-pass filters, Wheatstone bridge, bipolar voltage-regulation circuitry, and a high-resolution multi-channel analog-to-digital converter (ADC) (see FIG. 22). One example of an ADC is a Texas Instruments ADS1248 with 24-bit resolution and 2 kSPS sampling rate. The data acquisition circuitry 1418 senses the output signals from the robot skin apparatus 1408 and load cell 1412 and transmits the corresponding digitized signals to the microcontroller 1414 through SPI communication. The microcontroller then further processes the data and calculates the control effort. The microcontroller 1414 also forwards the collected data and the calculated control effort to an external computer 1420 via USB communication for online data visualization and offline analysis.

11. Experimental Results

In this section experimental results obtained after sensorizing the gripper are described. First, the skin sensor was systematically characterized against an off-the-shelf load cell. Next, experimental results of the closed-loop force control were collected and compared with results obtained by indirect pressure regulation of the grasp.

A. Skin Sensor Characterization

In order to systematically characterize the skin sensor, a separate experimental measurement unit was utilized. At the heart of this characterization system, there is a real-time National Instrument controller, cRIO 9074, which can perform time-sensitive, synchronous measurements from multiple sensors and devices. The setup also includes a Cartesian stage with a movable Z-axis displaced via a linear actuator from Newport Corp., USA. Attached to the Z-stage is a plunger to indent the surface of skin sensor, and a load cell from Transducer Techniques, USA to measure the forces exerted on the surface.

Figure 27:
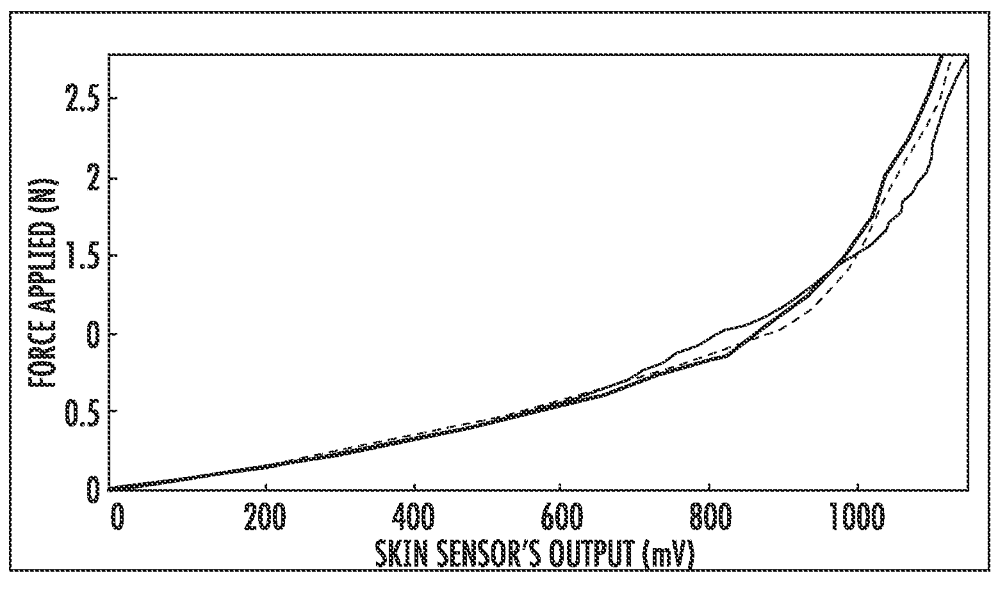
FIG. 27 is a strain-force graph showing a strain-force characteristic curve of a robot skin apparatus according to the invention.

A Lab VIEW program was designed to regulate the forces applied by the plunger via a real-time proportional-integral-derivative (PID) controller. Based on the force measurements from the load cell, the program controls the Z-axis linear stage to regulate a desired force value. Forces were applied on the surface of the skin sensor, while the load cell values (force applied) and the skin sensor's output (strain data) were synchronously recorded. The characterization process was repeated a few times. Using the two data streams, a strain-force characteristic curve was obtained as shown in FIG. 27. According to this figure and based on the evident nonlinear nature of the sensor's readings, a piecewise linear function was fit in the data, which served as the sensor's characteristic function. As can be seen in FIG. 27, the sensor shows less repeatability over larger forces, which is due to complex strain effects at larger deformations of Silicone and Kapton substrate.

In addition, due to the elasticity of the Silicone encapsulant, when the sensor is pressed and released, it regains its original shape but not immediately, which brings about a lower dynamic range and hysteresis while unloading. This, however, is not a severe condition in this application since in grasp force regulation the gripper finger starts from an open position and then grabs the workpiece. Such inward motion loads the sensor in one direction only. When dropping the object, on the other hand, the gripper fingers simply open without any force regulation. Therefore, in FIG. 27, the sensor's behavior is depicted only while being loaded.

B. Closed-loop Grasp Force Control

In this sub-section, several trials are performed to investigate the efficacy of the proposed tactile gripping technique and to validate the functionality of the augmented gripper developed in this paper. The goal is to examine the feasibility of regulating the force applied by the gripper on an object in an online manner using the feedback from the skin sensor. To this end, various force profiles, regulated using the skin sensor's feedback, were applied on a hanging sphere (3D printed using SLA stereolithographic resin material and radius of 15 mm) as the workpiece, while ground-truth load cell data was also collected.

Figure 28:
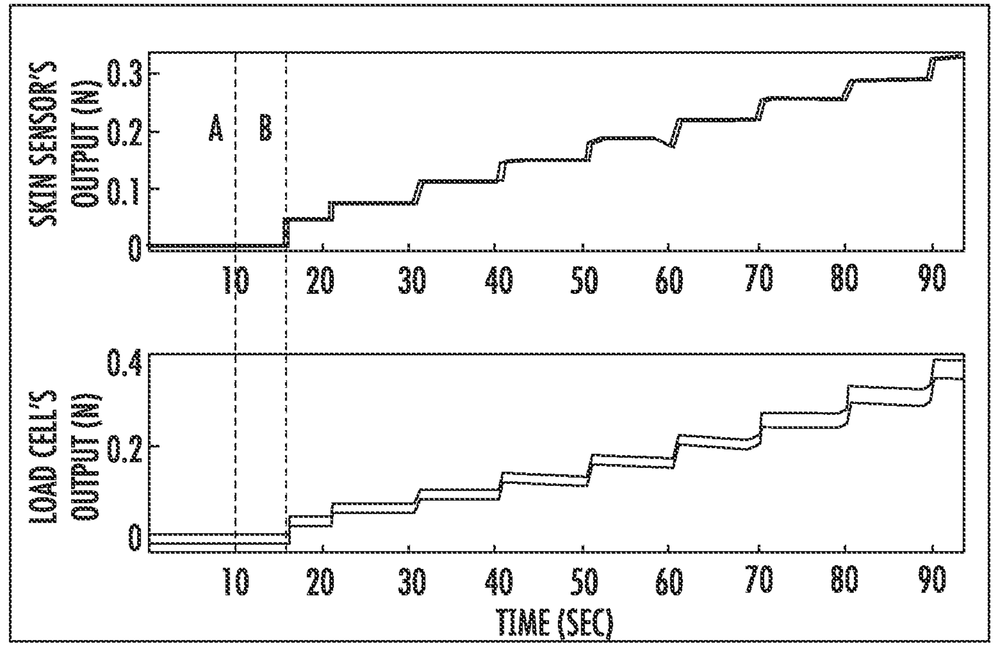
FIG. 28 is a pair of graphs comparing force applied in response to a staircase desired force signal with 50 mN increments of a robot skin apparatus and load cell.

To investigate the performance of the tactile manipulation technique proposed in this study regarding application of small forces, a staircase waveform with small increments of 50 mN was chosen as the desired force trajectory. The PI controller was discretized using the Tustin's method and the update rate of 64 Hz. The Ki and Kp parameters were tuned using the Ziegler-Nichols method [26]. FIG. 28 illustrates the system's response as well as the load cell data in the presence of the PI controller. In this figure, the gripper started from an open condition (point A), and then moved toward the workpiece until contact was made (point B). From this point onward, the applied force continued to grow until reaching the prescribed force value. Subsequently, a few increments of the desired force followed every 9 seconds. To investigate the sensor's repeatability, this experiment was carried out five times. As can be seen in FIG. 28, the tactile gripper can successfully reach and maintain the prescribed force trajectory. The system's response, as measured by both the skin sensor and the load cell (ground truth data), features repeatable behavior. This is due to the fact that forces applied in this experiment belong to the more repeatable region of the sensor's characteristic curve, i.e., small forces.

Figures 29, 30:
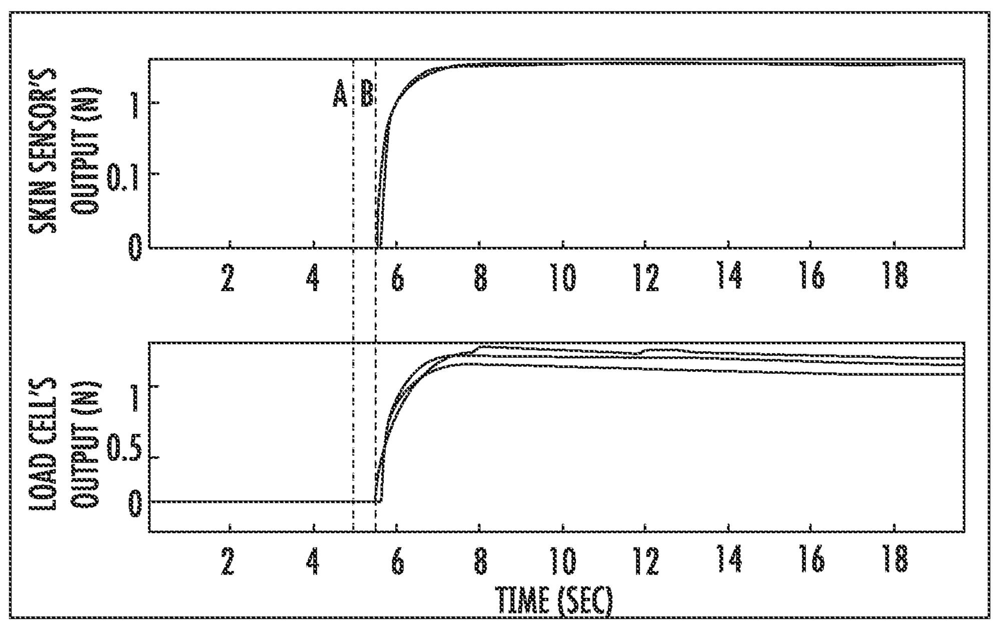
FIG. 29 is a pair of graphs comparing force applied in response to a step signal with 1.3 N amplitude of a robot skin apparatus and load cell.
FIG. 30 is a graph showing force applied and impact caused while using a sensor-less gripper.

As previously mentioned, an issue with pneumatic grippers is that the finger hits the workpiece at full speed which, in turn, may cause damage. As can be seen in FIG. 28, there were no impacts measured by the sensors. To further inspect this matter, the gripper was commanded with several step signals with larger amplitudes from an open condition. This experiment was carried out 10 times. FIG. 29 shows the forces applied on the workpiece as measured by both the skin sensor and the load cell. Point A denotes when the gripper starts its inward stroke, while point B is when the contact has been made with the workpiece. As evident in this figure, no impacts were recorded by any of the sensors at the contact point, which is due to (i) the elastic nature of the skin sensor which smooths the impact and dissipates the strain energy induced, and (ii) the closed-loop feedback constantly monitoring and controlling the force applied. There are minor fluctuations measured by the load cell at point A (before contact) which is due to structural vibrations as soon as the finger starts to move.

According to FIG. 29, larger prescribed forces can also be effectively reached and maintained by the tactile gripper. As the results show, however, the sensor's repeatability decreases over the large-force region of the characteristic curve as shown in FIG. 27. Furthermore, by inspecting FIG. 28 and FIG. 29, it is straightforward to determine the grasp status by monitoring the skin sensor's output. In these two figures, B points clearly correspond to when contact has been made.

This experiment was repeated with a sensor-less gripper. In this scenario, the skin sensor and the extra spring were removed from the gripper while the load cell was kept on the finger so as to measure the force applied on the workpiece. FIG. 30 illustrates the results. As can be seen in this figure, impacts with significant amplitudes, sometimes several folds larger than the steady-state value, may occur.

12. Conclusion

It will be understood that various details of the presently disclosed subject matter can be changed without departing from the scope of the subject matter disclosed and claimed herein.

Furthermore, the foregoing description is for the purpose of illustration only, and not for the purpose of limitation.

REFERENCES

Throughout this document, various references are cited. All such references are incorporated herein by reference, including the references set forth in the following list:

[1] Miller, S. (1984). Impacts of robotic and flexible manufacturing technologies on manufacturing costs and employment. Ph.D. Carnegie-Mellon University.

[2] Ayers, R. and Miller, S. (1981). The impacts of industrial robots. [ebook] Pittsburgh: Carnegie-Mellon University. Available at: http://repository.cmu.edu/cgi/viewcontent.cgi?article=1484&context=robotics [Accessed November 2017].

[3] Artificial Intelligence and Robotics and Their Impact on the Workplace. (2017). [ebook] IBA Global Employment Institute. Available at: https://www.ibanet.org/Document/Default.aspx?DocumentUid=c06aa1a3-d355-4866-beda-9a3a8779ba6e [Accessed November 2017].

[4] Ifr.org. (2017). How robots conquer industry worldwide. [online] Available at: https://ifr.org/downloads/press/Presentation_PC_27_Sept_2017.pdf [Accessed November 2017].

[5] Moniz, A. and Krings, B. (2016). Robots Working with Humans or Humans Working with Robots? Searching for Social Dimensions in New Human-Robot Interaction in Industry. Societies, 6(3), p. 23.

[6] T97—New ANSI RIA R15.06: Robot and Robot System Safety. (2014). [ebook] Rockwell Automation. Available at: https://www.rockwellautomation.com/resources/downloads/rockwellautomation/pdf/events/raotm/sessions/tech/T97NewANSIRIAR1506RobotandRobotSystemSafety.pdf [Accessed November 2017].'

[7] 10218-1:2011, I. (2017). ISO 10218-1:2011—Robots and robotic devices—Safety requirements for industrial robots—Part 1: Robots. [online] Iso.org. Available at: https://www.iso.org/standard/51330.html [Accessed November 2017].

[8] 10218-2:2011, I. (2017). ISO 10218-2:2011—Robots and robotic devices—Safety requirements for industrial robots—Part 2: Robot systems and integration. [online] Iso.org. Available at: https://www.iso.org/standard/41571.html [Accessed November 2017].

[9] Industrial Safety Requirements for Collaborative Robots and Applications. (2014). [ebook] ABB. Available at: https://www.roboticsbusinessreview.com/wp-content/uploads/2016/05/Industrial_HRC_-_ERF2014.pdf [Accessed November 2017].

[10] Cobots and Industrial Robots: Choose the Right Robot for the Job. (2017). [ebook] TM Robotics. Available at: http://www.tmrobotics.co.uk/wp-content/uploads/2017/04/Collaborative-vs.-Industrial-robot-wp_FINAL_3-16-17.pdf [Accessed November 2017].

[11] Lewis, C. (2017). The facts about Co-Bot Robot sales. [online] RobotEnomics. Available at: https://robotenomics.com/2016/01/11/the-facts-about-co-bot-robot-sales/?iframe=true [Accessed November 2017].

[12] Tai, K., El-Sayed, A., Shahriari, M., Biglarbegian, M. and Mahmud, S. (2016). State of the Art Robotic Grippers and Applications. Robotics, 5(2), p. 11.

[13] Bostelman, R. and Falco, J. (2012). Survey of Industrial Manipulation Technologies for Autonomous Assembly Applications. [ebook] Gaithersburg: NIST, pp. Eg: 3 & 40. Available at: http://ws680.nist.gov/publication/get_pdf.cfm?pub_id=908608 [Accessed November 2017].

What is claimed is:

1. A system comprising:

a pair of gripper fingers defining a space for receiving a workpiece;

a pneumatic actuator connected to the gripper fingers for causing the gripper fingers to open or close, the pneumatic actuator having an input for receiving a pressurized fluid a pressure regulator having a fluid input in fluid communication with a pressurized fluid source, an output in fluid communication with the pneumatic actuator, and a control signal input for controlling a flow of the pressurized fluid source to the output;

a robot skin apparatus positioned on one of the gripper fingers facing the other of the gripper fingers and the space for receiving the workpiece, the robot skin apparatus comprising:

a first pressure sensor comprising a first electrode and a second electrode in a spaced relationship that are symmetrically patterned on a first flexible substrate to form a substantially circular peripheral boundary that exhibits a symmetric omni-axial response due to the geometry of the first electrode and the second electrode; and polymer membranes encapsulating the first pressure sensor, the polymer membranes acting as applied force diffusion layers; and a main electronic unit comprising:

a microcontroller;

an analog-to-digital converter (ADC) having an input in communication with the first pressure sensor and an output in communication with the microcontroller; and an output device in communication with the microcontroller and the control signal input of the pressure regulator;

the microcontroller for processing data received from the robot skin apparatus via the ADC and determining control effort for controlling the pressure regulator via the output device.

2. The system of claim 1, wherein the first pressure sensor includes:

a piezo-sensitive material in contact with the first electrode and the second electrode to form a circuit therewith.

3. The system of claim 2, wherein the piezo-sensitive material is a flexible piezoresistive film covering the first electrode, the second electrode, and the space therebetween to form the circuit therewith, the circuit having a resistance varying with a strain on the first flexible substrate and the flexible piezoresistive film.

4. The system of claim 1, wherein the geometry of the first electrode and the second electrode have a symmetrical configuration with triangular-shaped inner electrode fingers arranged in a circular shape with the apex of each spoke pointing away from a center of the circular shape, and corresponding interdigitated triangular shaped outer electrode fingers.

5. The system of claim 1, wherein the geometry of the first electrode and the second electrode have a symmetrical configuration with rectangular-shaped inner electrode fingers arranged in a circular shape with the apex of each finger pointing away from a center of the circular shape and corresponding interdigitated outer electrode fingers.

* * * * *